(12) United States Patent
Vereschagin et al.

(10) Patent No.: US 11,276,160 B2
(45) Date of Patent: Mar. 15, 2022

(54) DETERMINING A CRITICAL DIMENSION VARIATION OF A PATTERN

(71) Applicant: APPLIED MATERIALS ISRAEL LTD., Rehovot (IL)

(72) Inventors: Vadim Vereschagin, Hod-HaSharon (IL); Roman Kris, Jerusalem (IL); Ishai Schwarzband, Or-Yehuda (IL); Boaz Cohen, Lehavim (IL); Ariel Shkalim, Even-Shmuel (IL); Evgeny Bal, Natanya (IL)

(73) Assignee: Applied Materials Israel LTD., Rehovot (IL)

( * ) Notice: Subject to any disclaimer, the term of this patent is extended or adjusted under 35 U.S.C. 154(b) by 0 days.

(21) Appl. No.: 16/652,970

(22) PCT Filed: Oct. 1, 2018

(86) PCT No.: PCT/US2018/053789
§ 371 (c)(1),
(2) Date: Apr. 1, 2020

(87) PCT Pub. No.: WO2019/070600
PCT Pub. Date: Apr. 11, 2019

(65) Prior Publication Data
US 2020/0327652 A1 Oct. 15, 2020

Related U.S. Application Data

(60) Provisional application No. 62/634,686, filed on Feb. 26, 2018, provisional application No. 62/567,150, filed on Oct. 2, 2017.

(51) Int. Cl.
*G06T 7/13* (2017.01)
*G06T 7/00* (2017.01)
*G06T 7/60* (2017.01)

(52) U.S. Cl.
CPC ............. *G06T 7/001* (2013.01); *G06T 7/13* (2017.01); *G06T 7/60* (2013.01); *G06T 2207/30148* (2013.01)

(58) Field of Classification Search
CPC .. G06T 7/001; G06T 7/13; G06T 7/60; G06T 2207/30148; G06T 7/12
(Continued)

(56) References Cited

U.S. PATENT DOCUMENTS

2009/0231424 A1* 9/2009 Honda ................. G06T 7/0006
348/87
2010/0158345 A1* 6/2010 Kitamura ............. G06T 7/0006
382/145
(Continued)

FOREIGN PATENT DOCUMENTS

KR 10-2015-0109426 A 10/2015
WO 2016113551 A1 7/2016

OTHER PUBLICATIONS

International Search Report and Written Opinion for PCT Application No. PCT/US2018/053789, dated Feb. 25, 2019, 12 pages.

*Primary Examiner* — Sheela C Chawan
(74) *Attorney, Agent, or Firm* — Lowenstein Sandler LLP

(57) ABSTRACT

A captured image of a pattern and a reference image of the pattern may be received. A contour of interest of the pattern may be identified. One or more measurements of a dimension of the pattern may be determined for each of the reference image and the captured image with respect to the contour of interest of the pattern. A defect associated with the contour of interest may be classified based on the determined one or more measurements of the dimension of the pattern for each of the reference image and the captured image.

17 Claims, 16 Drawing Sheets

(58) Field of Classification Search
USPC .............. 382/149, 181, 209, 217, 218, 199
See application file for complete search history.

(56) References Cited

U.S. PATENT DOCUMENTS

| | | | |
|---|---|---|---|
| 2010/0215247 A1* | 8/2010 | Kitamura ................ | G06T 7/001 |
| | | | 382/149 |
| 2012/0298862 A1* | 11/2012 | Chen ....................... | H01J 37/28 |
| | | | 250/307 |
| 2014/0212024 A1 | 7/2014 | Chen et al. | |
| 2015/0012900 A1* | 1/2015 | Shifrin .................... | H01L 22/12 |
| | | | 716/112 |
| 2015/0109426 A1 | 4/2015 | Cho et al. | |

* cited by examiner

Ratio = 0.83

DETERMINING A CRITICAL DIMENSION VARIATION OF A PATTERN

TECHNICAL FIELD

The present disclosure relates to critical dimensions, and more specifically, relates to determining a critical dimension variation of a pattern.

BACKGROUND

The advancement of the fabrication or manufacturing of integrated circuits on semiconductor wafers utilizes increasingly smaller design elements to implement the integrated circuits. For example, an integrated circuit may be implemented on the semiconductor wafer as one or more patterns of design elements that correspond to different portions of the integrated circuit. The fabrication or manufacturing process can result in one or more defects of the integrated circuit on the semiconductor wafer. Such defects may be identified and/or classified by measuring the dimensions of the patterns of design elements that correspond to the different portions of the integrated circuit.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In implementations, a captured image of a pattern may be received. A reference image of the pattern may be received. A contour of interest of the pattern may be identified. One or more measurements of a dimension of the pattern may be determined for each of the reference image and the captured image with respect to the contour of interest of the pattern. A defect associated with the contour of interest may be classified based on the determined one or more measurements of the dimension of the pattern for each of the reference image and the captured image.

In some implementations, the contour of interest corresponds to a location of a modification to the pattern that is associated with the defect.

In some implementations, the determining of the one or more measurements of the dimension of the pattern further includes determining a first plurality of measurements at a particular point of the pattern to a plurality of points along the contour of interest of the pattern in the captured image where each of the first plurality of measurements corresponds to a distance from the particular point to the respective point along the contour of interest in the captured image. Furthermore, a second plurality of measurements may be determined at the particular point of the pattern to a plurality of points along the contour of interest of the pattern in the reference image where each of the second plurality of measurements corresponds to a distance from the particular point to the respective point along the contour of interest in the reference image.

In some implementations, the plurality of points along the contour of interest are associated with different directions from the particular point of the pattern to the contour of interest.

In some implementations, the method further includes determining a critical dimension parameter value for each respective point along the contour of interest based on a pair of measurements from the first and second plurality of measurements.

In some implementations, the defect is classified based on the critical dimension parameter value having a maximum relative difference between a respective measurement from the first plurality of measurements associated with the captured image and another respective measurement from the second plurality of measurements associated with the reference image.

In some implementations, the one or more measurements are determined based on a distance transform function.

BRIEF DESCRIPTION OF THE DRAWINGS

The present disclosure will be understood more fully from the detailed description given below and from the accompanying drawings of various implementations of the disclosure.

DETAILED DESCRIPTION

Figure 1A:
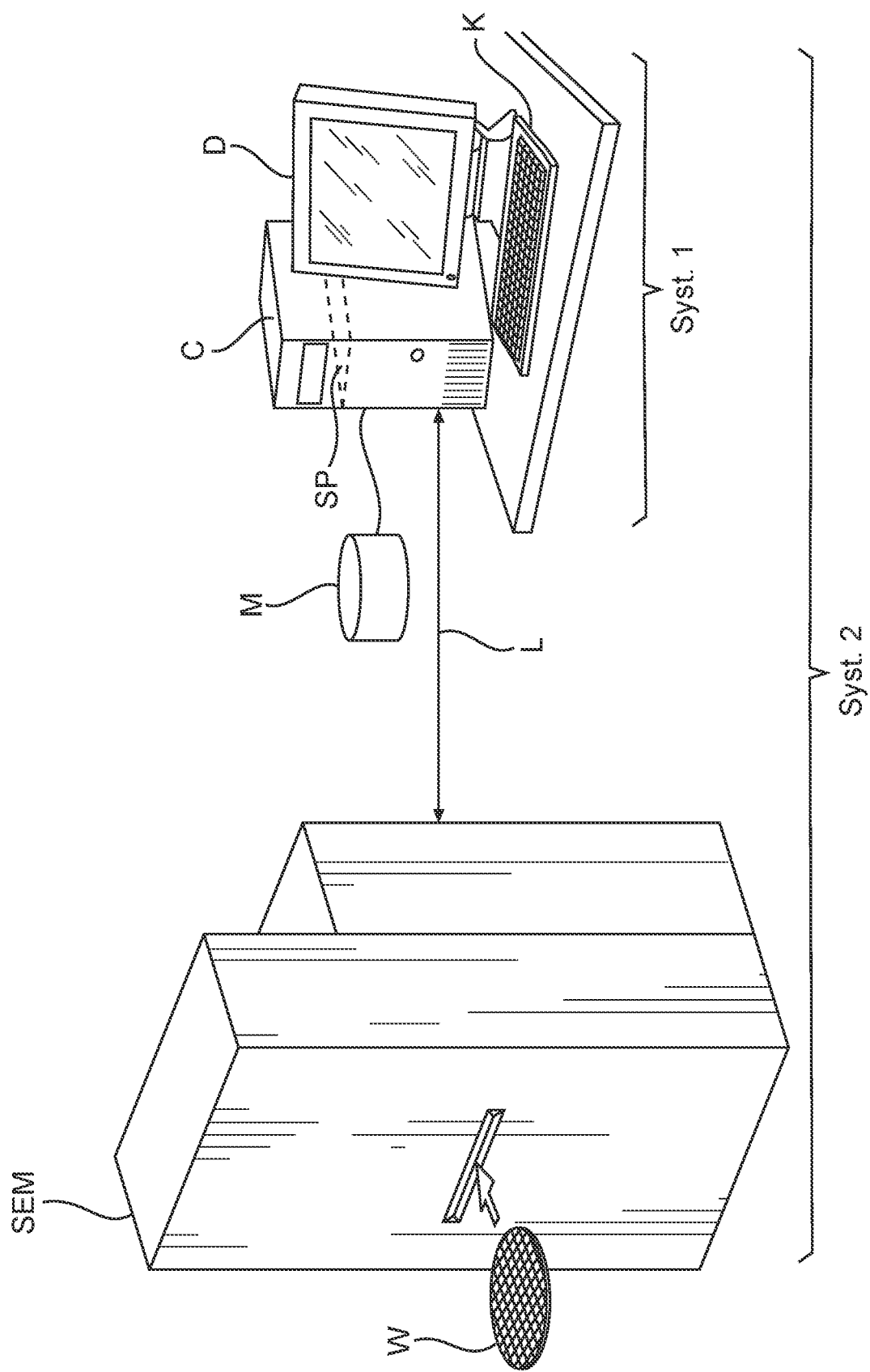
FIG. 1A illustrates a block diagram of an example system to determine a variation of a critical dimension (CD) of a pattern.

Aspects of the present disclosure are directed to determining a critical dimension variation of a pattern. In general, a semiconductor wafer inspection system may analyze a semiconductor wafer that includes patterns corresponding to an integrated circuit. For example, the inspection system may identify any defects at the patterns of the semiconductor wafer and may classify the identified defects.

The semiconductor wafer inspection system may identify patterns that correspond to defects at the semiconductor wafer. The patterns may correspond to various shapes and complex structures. During the fabrication of an integrated circuit on the semiconductor wafer, the shapes or structure of particular patterns may be altered from the intended shape or structure of the particular patterns. Such alterations of the patterns may result in a defect of the semiconductor wafer. An operator of the semiconductor wafer inspection system may inspect each defect. For example, the operator may inspect the defect and may determine if the alteration in the pattern results in an impact of the integrated circuit fabricated on the semiconductor wafer. However, the patterns fabricated on the semiconductor wafer may correspond to different shapes and/or structures. Thus, an extensive amount of time from the operator of the semiconductor wafer inspection system may be needed to review the many different shapes and/or structures of the different patterns.

Aspects of the present disclosure address the above and other deficiencies by determining a critical dimension variation of a pattern. Various critical dimensions of a pattern may be determined and used to determine whether a variation in the critical dimension may result in a reduction of quality (e.g., a defect) of the corresponding pattern. As an example, a reference image (e.g., an expected pattern) and an inspection image (e.g., a pattern that has been fabricated and/or is associated with a defect) may be received. A critical dimension value or parameter of a particular pattern from the reference image and a critical dimension value or parameter of a corresponding pattern from the inspection image may be determined.

In some embodiments, a distance transform (DT) operation may be used to determine the critical dimension values. The critical dimension values may be determined by identifying a contour of interest (COI) of a pattern and measuring distances based on the identified contour of interest. The contour of interest may be considered a modified portion (MP) of the pattern. For example, the modified portion may correspond to a part of the pattern of the inspection image that is different than a corresponding part of the corresponding pattern of the reference image. A first critical dimension value may be determined for the contour of interest of a pattern of the reference image. In some embodiments, the first critical dimension value is a distance between a location of the pattern and the contour of interest on the reference image. The second critical dimension value may be a distance between a corresponding location of the pattern and the contour of interest on the inspection image. Thus, two dimension values of the pattern may be determined. The variation or a parameter of the critical dimension may then be determined based on a combination of the first critical dimension value and the second critical dimension value. In some embodiments, the variation or parameter of the critical dimension value may be based on a ratio between the first and second critical dimension values. As such, the critical dimension variation or parameter may identify a change of the pattern as a result of the modified portion of the pattern. Such a critical dimension variation or parameter may then be used to determine whether the variation or change in the pattern is significant. For example, if the critical dimension variation or parameter exceeds a threshold value associated with the pattern, then the modified portion may result in a defect that is to be addressed in the semiconductor fabrication process for the semiconductor wafer.

Advantages of the present disclosure include, but are not limited to, an increased efficiency of the semiconductor wafer inspection system. For example, the critical dimension variation or parameter can be determined for many different types of patterns without the input of an operator of the semiconductor wafer inspection system. As such, the inspection of the semiconductor wafer may utilize less time. Additionally, the determining of the critical dimension variation of a pattern by the semiconductor wafer inspection system may increase the reliability of the semiconductor fabrication process as certain patterns with critical dimension variation indicative of a defect may be addressed during the fabrication process so that subsequent defects are reduced for subsequent semiconductor wafers.

FIG. 1A illustrates a block diagram of an example system to determine a variation of a critical dimension (CD) of a pattern. The system may correspond to a semiconductor wafer inspection system.

As shown in FIG. 1A, a first system (Syst. 1) may correspond to a computer system that includes a processing device (e.g., a processor) that may implement a critical dimension component (SP). In some embodiments, the critical dimension component may correspond to a firmware unit, a software product, or a software application). The critical dimension component may implement a distance transform (DT) function to determine critical dimension values or measurements for patterns of the semiconductor wafer W. In some embodiments, the first system S1 may include a memory M, a computing device C, a display D, and an input unit (e.g., a keyboard) K. The computing device C may be operatively coupled with an optical tool or a scanning electron microscope (SEM) via a communications link L. Although an SEM is illustrated, any other type of optical equipment may be used to obtain an image of the semiconductor wafer W.

In operation, the computing device C receives data of the semiconductor wafer W from the SEM. The SEM may produce one or more images of one or more patterns manufactured on a semiconductor wafer W. The computing device C may receive a reference image (e.g., from the memory M) corresponding to the one or more patterns to determine the variation in the critical dimensions of the one or more patterns.

The DT function may be used to determine, for any arbitrary pattern, its critical dimension with respect to a specific location on the pattern when the pattern has been modified or may be modified. The CD variation may be determined relative to a reference image which may be presented by a simulated computer aided design (CAD) image of the design corresponding to the pattern and/or an image of a corresponding pattern that does not include a modified portion (e.g., a pattern with no possible defect).

In some embodiments, the DT function may allow for robust and accurate estimation of the CD in the vicinity of a defect. The DT function may allow the semiconductor wafer inspection system to improve the monitoring of CD and critical dimension variation (CDV) on all types of patterns with different structures without an operator defining the actual measures expected per pattern type.

Figure 1B:
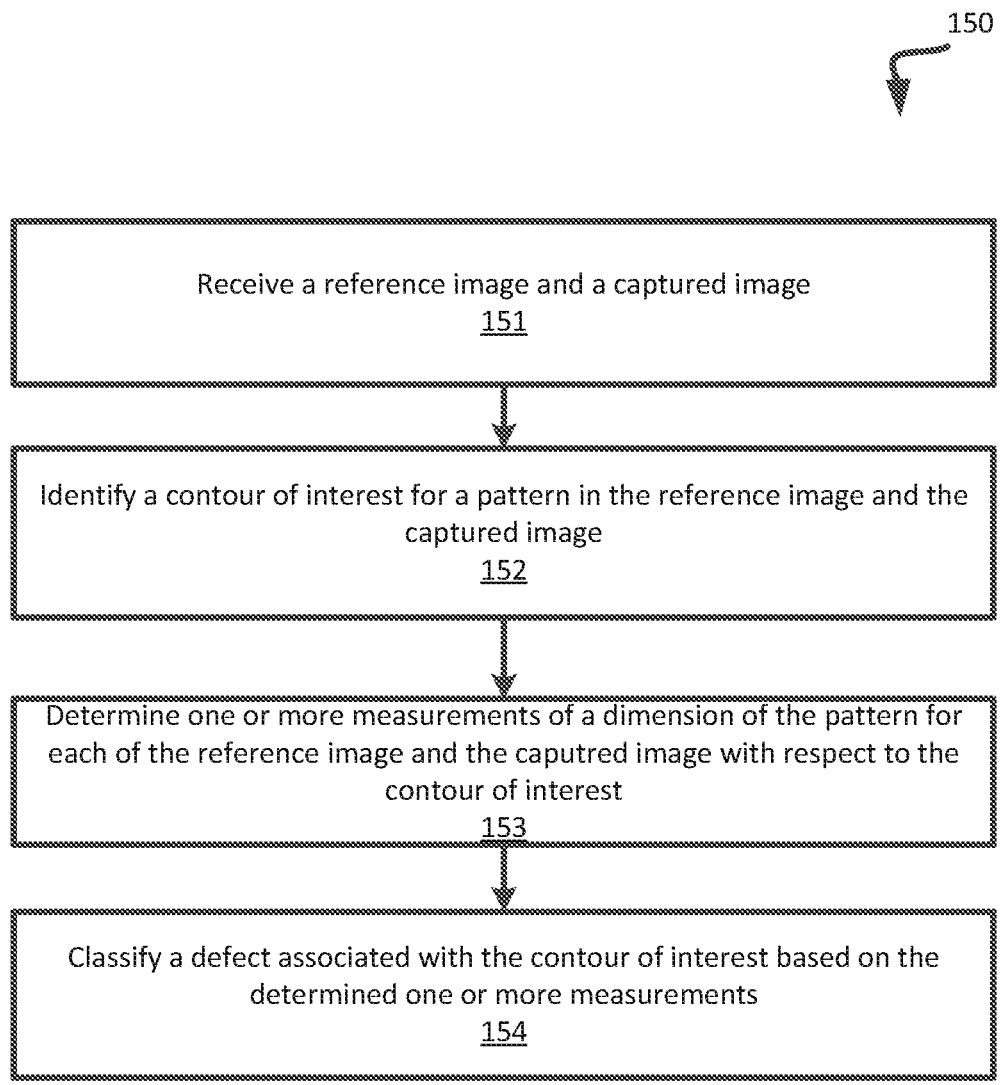
FIG. 1B illustrates a flow diagram of an example method to determine a variation of a critical dimension of a pattern in accordance with some embodiments.

FIG. 1B illustrates a flow diagram of an example method 150 to determine a variation of a critical dimension of a pattern. The method 150 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 150 may be performed by the critical dimension component (SP) of FIG. 1A.

As shown, at block 151, the processing logic may receive a reference image and a captured (or inspection) image. The reference image and the captured image may include a pattern of a semiconductor wafer. The pattern of the reference image may be considered an ideal pattern without any defects or modifications and the pattern of the captured image may include a defect or a modification. Thus, the reference image may include a pattern and the captured image may include a fabrication of the pattern from the reference image. At block 152, the processing logic may identify a contour of interest for a pattern in the reference image and the captured image. For example, the contour of interest may be a boundary or portion of the pattern that includes a modification in the captured image. The modification may be a change to the pattern at the boundary or the portion relative to the corresponding pattern in the reference image. In some embodiments, the modification may be a result of a defect or a potential defect to the pattern. As such, a portion of the pattern may be identified as the contour of interest.

At block 153, the processing logic may determine one or more measurements of a dimension of the pattern for each of the reference image and the captured image with respect to the contour of interest. For example, a location on the pattern may be identified. The location may be at a normal position relative to the contour of interest of the pattern. Thus, the location may be separate from the contour of interest. The measurements may be obtained for multiple points or locations along the contour of interest. In some embodiments, a first measurement may be obtained for the reference image and a second measurement may be obtained for the captured image. For example, the first measurement may be obtained to measure a distance between the location on the pattern relative to a point on the contour of interest on the pattern of the captured image. A second measurement may then be obtained for the captured image at the same location on the pattern in the reference image (e.g., the same location as the captured image) to measure the distance between the location and a corresponding point on the pattern. In some embodiments, multiple pairs of measurements may be obtained relative to each different point on the contour of interest. Thus, for each point along the contour of interest, a distance value for the reference image and another distance value for the captured image may be obtained.

Referring to FIG. 1B, at block 154, the processing logic may classify a defect associated with the contour of interest based on the determined one or more measurements. The defect may result in the contour of interest. In some embodiments, the defect may be classified as significant or not significant with respect to causing a based on the one or more measurements. The defect may be significant if the defect results in a failure of an integrated circuit that includes the pattern. The defect may be classified based on a critical dimension parameter value that is selected based on the one or more measurements. For example, for each pair of measurements, a critical dimension parameter may be determined based on a combination of the first measurement from the reference image and the second measurement from the captured image with respect to the same location on the pattern and the same point along the contour of interest. The critical dimension parameter may be a ratio between the first measurement and the second measurement. The critical dimension parameter with the maximum value that indicates a maximum change along the contour of interest between the pattern of the reference image and the pattern of the captured image may then be selected as the critical dimension parameter. The defect may then be classified based on the selected critical dimension parameter exceeding a threshold value. For example, if the critical dimension parameter exceeds the threshold value, then the contour of interest may be considered a significant defect. Otherwise, if the critical dimension parameter does not exceed the threshold value, then the contour of interest may not be considered a significant defect. In some embodiments, the threshold value may vary based on the type (e.g., shape) of the defect associated with the contour of interest.

As used herein, a reference pattern (e.g., an original, initial, desired, designed, planned pattern) may be compared with just a pattern (which may also be called arbitrary, captured, real, modified, defected pattern, inspection, a pattern affected by modification). In some embodiments, a reference image of the pattern may be, for example, a CAD image, a simulated image of a desired reference pattern, a SEM-generated grey-level image of a reference pattern created during a manufacturing process, an image of a reference pattern, created by optical tools (for example, in mask inspection), a die or a group of dies (for example, a neighboring die), etc. A reference contour may be a contour of the pattern at the reference image. For a pattern being a sole feature, any contour of its reference image may be understood as its reference contour. For a pattern that includes internal (or child) contours, both the external contours and the internal contours on the reference image of such a pattern may serve as reference contours. In a group of patterns, an external contour of a pattern neighboring to a basic pattern may be considered a reference contour for the basic pattern.

A captured image of the pattern may refer to information indicative of brightness created on a lithographic mask or on a semiconductor wafer upon irradiating with a beam of primary electrons. In such a case, the captured image corresponds to a real/arbitrary/modified pattern. Alternatively, the captured image may be a simulated image of a planned modification of a reference pattern. The captured image may therefore be any generated image based on the signal captured as a result of scanning the mask or the semiconductor wafer with an optical or a primary electron beam, information based on the captured signals (e.g., a file of digital measurements of brightness of the image), a functional of the image, data obtained upon the image processing, filtering or enhancing, or a a simulated image. Both the reference image and the captured image may be in the form of a visible image (e.g., grey-level images obtained by SEM). A captured contour may refer to a contour of a pattern included in the captured image.

As used herein, a modified portion may refer to at least one item on a pattern. For example, the modified portion may be, but is not limited to, a change, a defect, an added feature, a region having characteristics different from other regions of the pattern. The modified portion may have an arbitrary shape/contour and may be located on any part of the pattern. The modified portion may be a virtual modified portion such as an area on the pattern where the mentioned change/defect/added feature/region is planned/expected. Contour of interest (COI) may refer to a set of points on a pattern, affected or expected to be affected by a modification of an initial (reference) pattern. For example, the COI may be at least a part of a reference contour that is adjacent to a modified portion (real or virtual) and at a location where the modified portion is "attached" (or supposed to be attached) to the reference image/contour. For example, the contour of interest may be understood as a part of a reference contour approximate to a modified portion or as a border between a pattern and its modified portion. The contour of interest may be pre-selected in advance, or be determined based on at least one of the pattern images (a captured one or a reference one) and based on information about location and shape of the modified portion (defect). A section of the modified portion's contour, which is not part of the reference contour, may be called a modified contour of interest (COI). The contour of interest may be defined for a pattern without any visible modified portions (defects). For example, a specific section of a reference contour where a potential modification is possible may be considered the contour of interest and called a supposed (or virtual) contour of interest. A CD parameter can be determined for such a pattern with respect to the supposed contour of interest having a specific location on the pattern.

The Distance Transform (DT) function may be an operation performed on a derived representation of a digital image. The DT function may be defined as a map labeling each pixel of the image of interest with the distance to the nearest non-zero pixel. For example, a non-zero obstacle pixel may be a boundary pixel in a binary image.

Figure 2A:
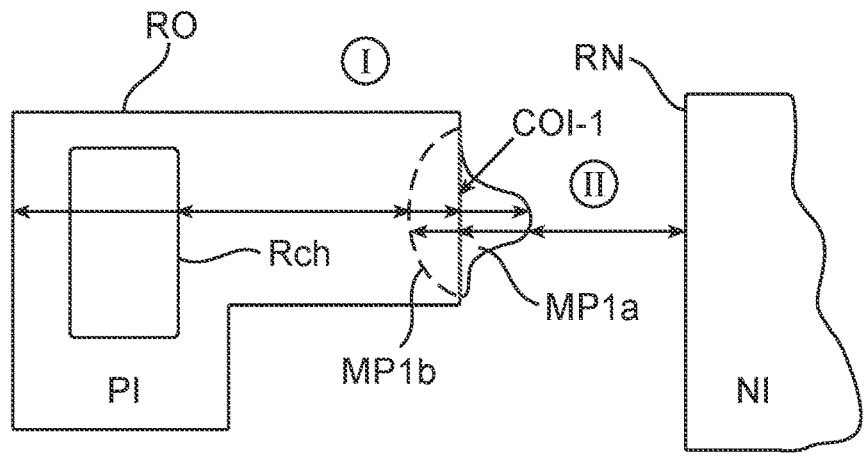
FIG. 2A illustrates an example pattern of a semiconductor wafer in accordance with some embodiments of the present disclosure.

FIG. 2A illustrates an example pattern of a semiconductor wafer. As shown, a basic pattern P1 may include its own external contour marked as RO (reference own contour) and an internal/child contour marked as RCh (reference child contour). A neighbor pattern N1 is located close to the pattern P1. A modified portion MP1 may appear on one side of the pattern P1. MP1 may be a protrusion (shown by the protruding bold line marked MP1$a$). In some embodiments, the modified portion may be a recess such as MP2 (e.g., the dashed bold line). Such a modified portion is marked as MP1$b$. The contour of interest may be the border between MP1$a$ or MP1$b$ and the RO (e.g., the portion of RO between the dashed bolded line)

As shown, two types of CD measurements may be determined. For example, a first type (Type I) may be a measurement of own CD for the pattern P1 to estimate how the defect MP1 affects quality of the own hosting pattern P1. The second type (Type II) may be a measurement of neighbor-wise CD of pattern P1 with respect to pattern N1 to estimate how the defect MP1 affects the surrounding of pattern P1.

Figure 2B:
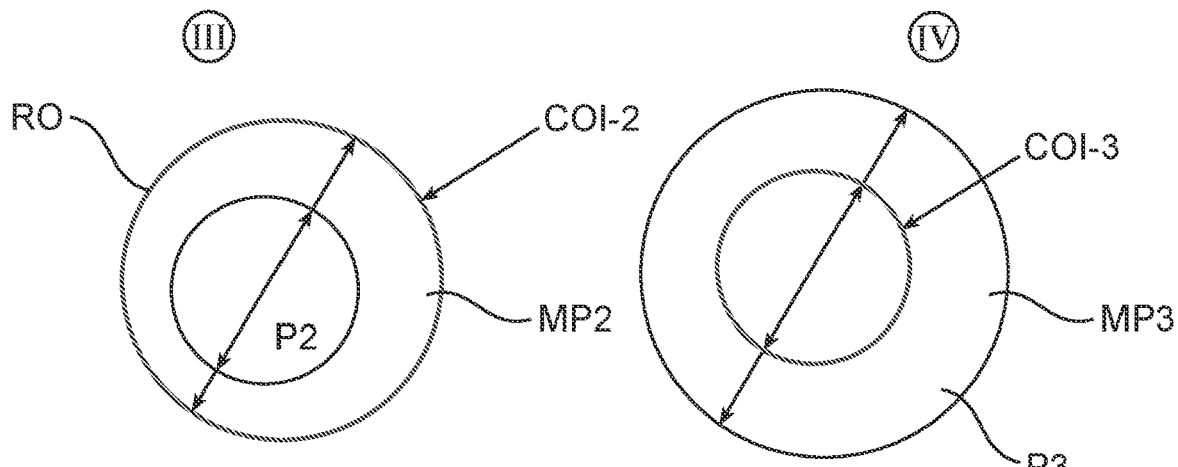
FIG. 2B illustrates another example pattern of a semiconductor wafer in accordance with some embodiments of the present disclosure.

FIG. 2B illustrates another example pattern of a semiconductor wafer. As shown, a type III and a type IV measurement may be determined. For the type III measurement, the pattern P2 has been shrunk (its diameter/global dimension has uniformly decreased) during the manufacturing process. The outer thin contour is marked as reference own contour RO of P2, while the inner bold contour is the new, modified contour of P2. The difference is marked as an annular modified portion MP2. The border between the modified portion MP2 and the reference pattern is the pattern's reference contour RO which is considered as the Contour of interest COI-2. The type IV may be a measurement where the global dimension/diameter of pattern P3 has increased during the manufacturing (the new, modified contour of P3 is shown by the bold line). The reference own contour of pattern P3 is marked RO. Since the whole RO has changed, RO also represents the border of the modified portion MP3. In this case, the whole RO is the contour of interest COI-3. This type of a defect is type IV, which can be served by the proposed technique of Critical Dimension measurement to determine own CD of patterns similar to P3.

Figure 2C:
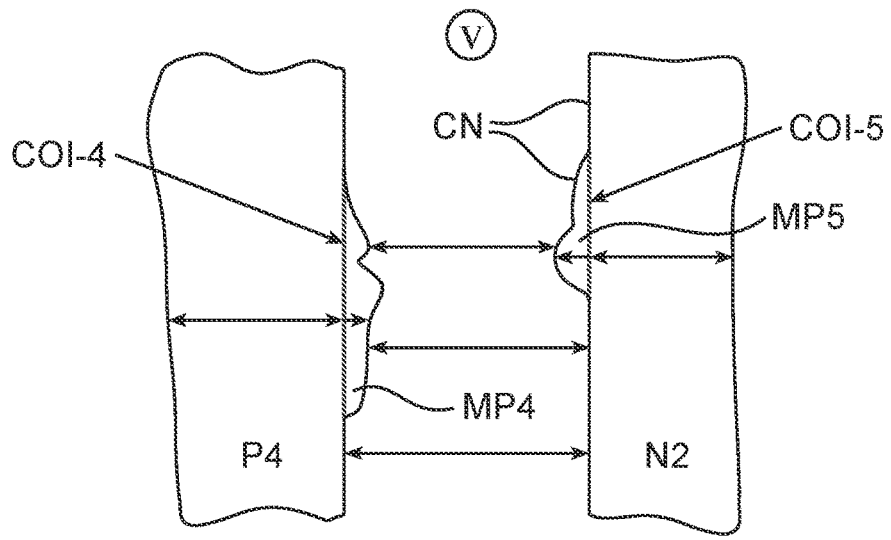
FIG. 2C illustrates another example pattern of a semiconductor wafer in accordance with some embodiments of the present disclosure.

FIG. 2C illustrates another example pattern of a semiconductor wafer. For example, FIG. 2C may be considered a variation of FIG. 2A, where pattern P4 and a neighboring pattern N2 both have defects (MP4, MP5) which together change the distance between the neighboring patterns and thus change the neighbor-wise CD for any of such patterns. This type of a defect is type V, where the contour of interest for pattern P4 is COI-4 while CN (the captured contour of the neighbor pattern N2) may serve as a reference contour with respect to which influence of the defects MP4 and MP5 is estimated. COI-5 is a contour of interest for pattern N2, if its own CD is estimated.

Figure 2D:
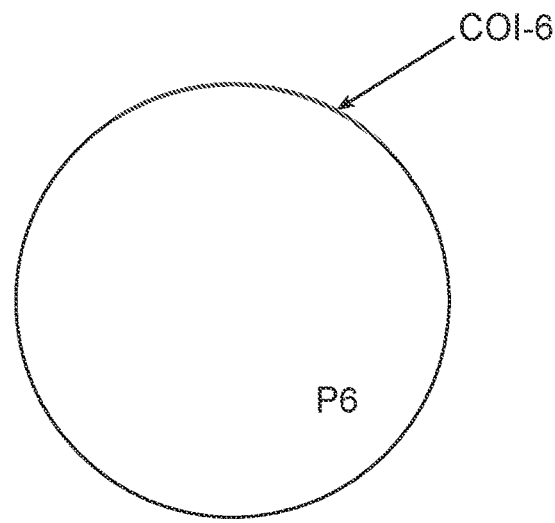
FIG. 2D illustrates another example pattern of a semiconductor wafer in accordance with some embodiments of the present disclosure.

FIG. 2D illustrates another example pattern of a semiconductor wafer. As shown, the pattern may be a circular pattern P6 that includes a contour of interest COI-6 on one of its arcs. Modified portion may appear on the arc, as indicated by contour of interest COI-6. The measurement of the CD parameter of the pattern P6 may be based on the location of the COI-6.

Figure 2E:
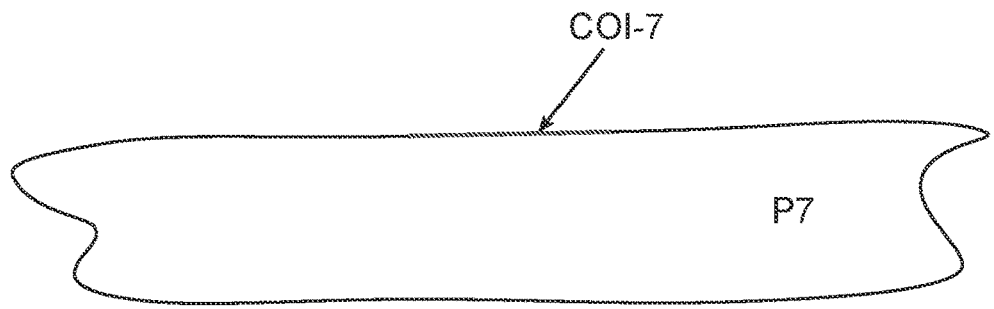
FIG. 2E illustrates another example pattern of a semiconductor wafer in accordance with some embodiments of the present disclosure.

FIG. 2E illustrates another example pattern of a semiconductor wafer. As shown, the pattern may correspond to a linear pattern P7 with a contour of interest COI-7, which may be supposed (e.g., virtual or imaginary). The CD parameter of the pattern P7 may be determined based on the location of the COI-7.

Figure 2F:
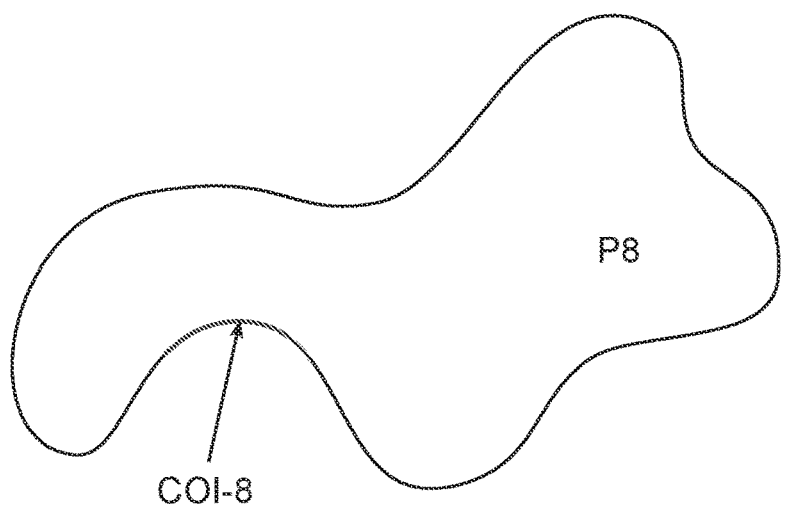
FIG. 2F illustrates another example pattern of a semiconductor wafer in accordance with some embodiments of the present disclosure.

FIG. 2F illustrates another example pattern of a semiconductor wafer. As shown, the pattern P8 may include a complex shape. The critical dimension parameter of the pattern P8 may be determined with respect to a contour of interest COI-8. In some embodiments, the critical dimension parameter may correspond to identifying which dimension of pattern P8 will be most affected if a modified portion appears on COI-8.

Although FIGS. 2A-2F describe various examples of patterns, the critical dimension variation of any type or shape of pattern may be determined.

Figure 3A:
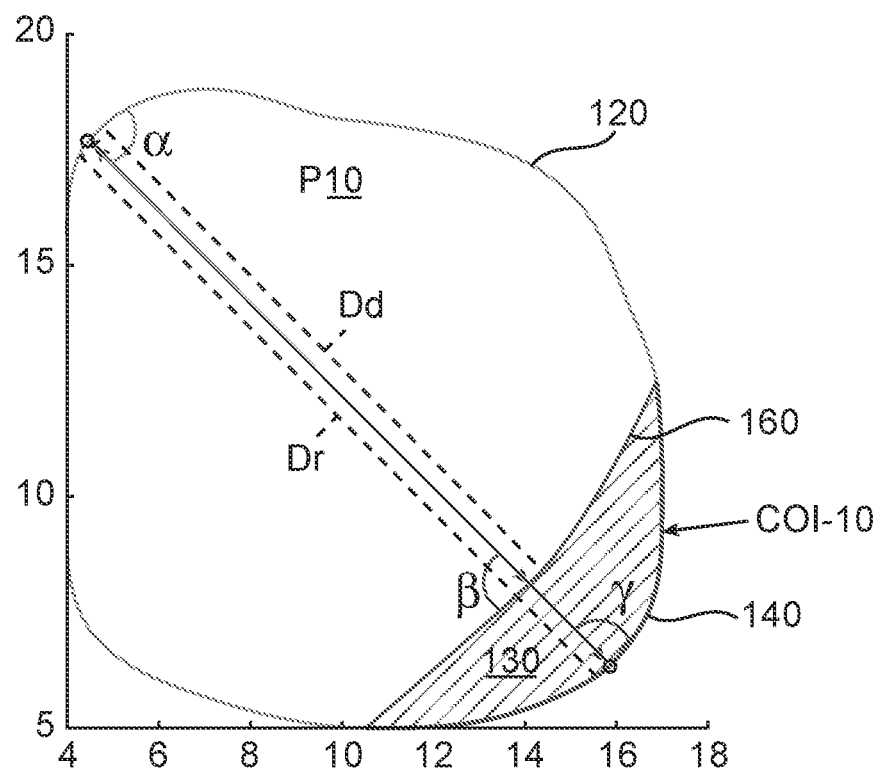
FIG. 3A illustrates an example pattern with a defect associated with a critical dimension in accordance with some embodiments.
Figure 3B:
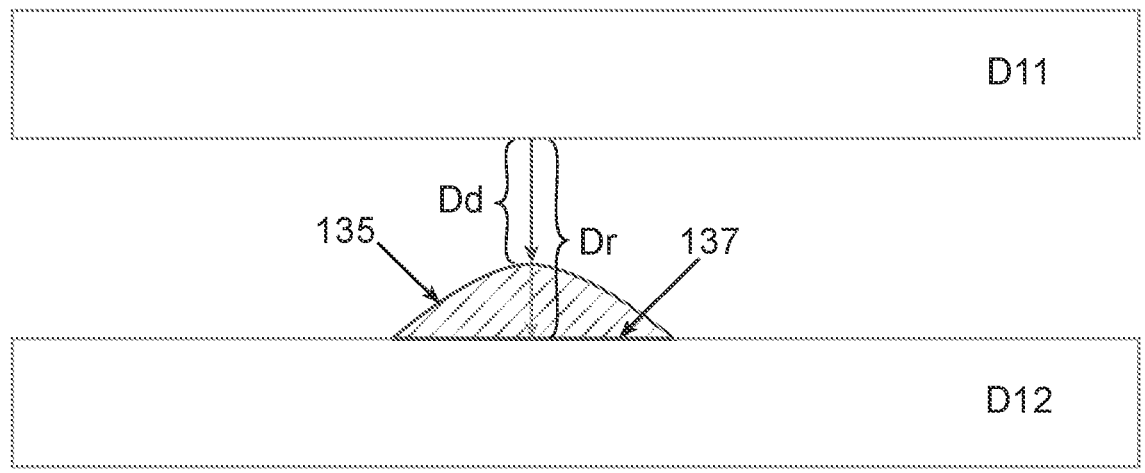
FIG. 3B illustrates another example pattern with a defect associated with a critical dimension in accordance with some embodiments.
Figure 3C:
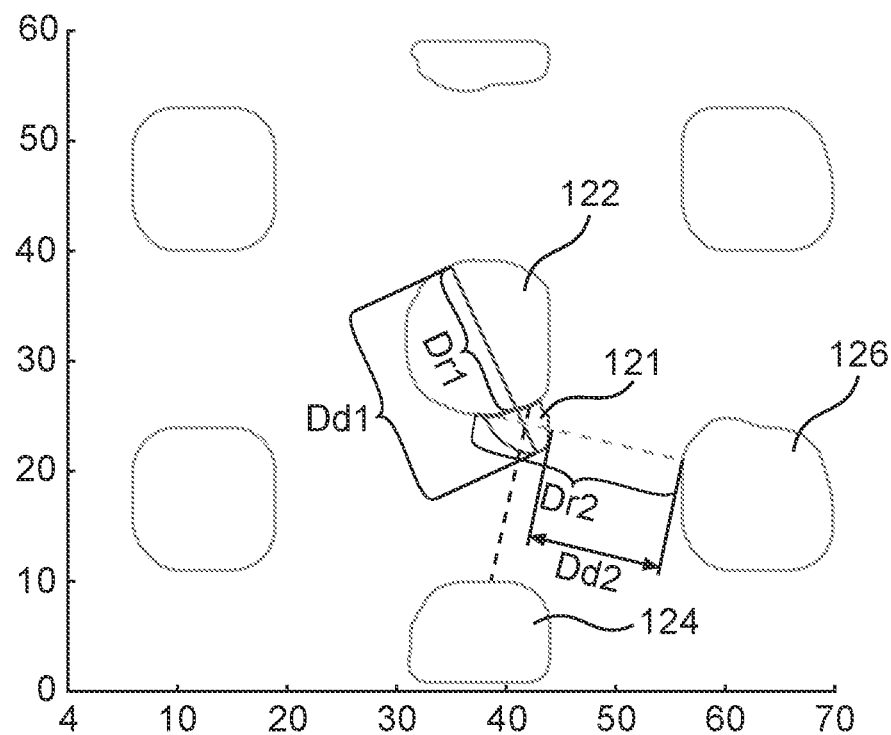
FIG. 3C illustrates another example pattern with a defect associated with a critical dimension in accordance with some embodiments.

FIGS. 3A, 3B, and 3C show how to determine the relative influence of a pattern modification (e.g., defect) on the CD of a pattern. An arbitrary pattern may include a modified portion (for example, a defect) that changes the external contour of the pattern and the CD of the pattern as a result of the change. The modified portion on the pattern may affect CD of the pattern with respect to one or more neighboring patterns.

FIG. 3A illustrates an example pattern with a defect associated with a critical dimension. As shown, the pattern may include an in-pattern defect (i.e., a clear target area). For example, a pattern P10 may include a complex shape. The planned reference shape of the pattern is represented by the contour 120 and 140. The real pattern P10 includes a defect or modified portion MP (shaded area 130) that changes the external contour of the pattern. For example, the modified pattern now terminates at the border/edge 160 (as opposed to 140). The edge 140 may be considered a contour of interest (COI-10) of the pattern P10.

In this case, the CD of the pattern P10 is its dimension or measured distance which maximally differs (or is maximally changed) relatively to that of a reference pattern. For example, the maximally changed distance be a distance maximally affected by the modified portion/defect 130. As can be seen from FIG. 3A, the diameter Dr of the reference pattern P10, measured in vicinity and preferably perpendicularly to the contour of interest 160, is clearly greater than the diameter Dd (captured) of the defect pattern, measured in the same direction (in the vicinity and preferably perpendicularly to the contour of interest 160). For example, the diameter Dd (i.e., the defect diameter) may be the distance between the 'o' at contour 120 and the contour 160 and the diameter Dr (i.e., the reference diameter) may be the distance between the 'o' at the contour 120 and the 'o' at contour 140. The ratio Dd/Dr may indicate the maximal effect of the defect so that the Dd (captured) may be considered the CD of the modified pattern P10. Since Dr may be considered the CD of the reference pattern, the ratio may be specified as CDcaptured/CDreference.

Given the ratio and a specific direction of the measurement, the critical dimension variation (CDV) of the pattern P10 may be determined as follows:

$$CDV = \frac{[1 - \text{Ratio}]}{1 + C(|\cos(\alpha)| + |\cos(\beta)| + |\cos(\gamma)|)} \quad [3]$$

In some embodiments, the value Ratio is the ratio as previously described, the value C is a weight coefficient and the values $\alpha$, $\beta$, and $\gamma$ are angles respectively formed by the measurement direction selected for the CD with respect to reference contour RC, contour of interest COI, and the modified contour of interest MCOI as illustrated.

FIG. 3B illustrates another example pattern with a defect associated with a critical dimension. For example, FIG. 3B shows a pair of patterns D11 and D12 where the patterns are straight lines. A defect 135 on the pattern D12 changes both its own CD and its neighbor-wise CD (e.g., a critical dimension with respect to the neighboring pattern D11). For CD with respect to the neighboring pattern D11, the reference distance Dr (measured between the unchanged/reference pattern D12 and the neighboring pattern D11) may be compared with distance Dd (measured between the defected pattern D12 and the neighboring pattern D11). It is understood that such a distance is maximally affected by the defect 135.

To estimate/measure the relative influence of a defect (or any modified portion in a pattern) on the CD of that pattern, the ratio of Dd/Dr may be used. The ratio may be based on a distance Dd measured on a captured image of the modified pattern (e.g., the defect) and a distance Dr measured on a reference image of the non-modified pattern (e.g., without the defect), wherein both distances are measured in vicinity of the modified portion. For example, the distances may be measured in the vicinity of the contour of interest 137 (e.g., as bounded by the defect 135). The maximal ratio may be selected as the CD ratio.

FIG. 3C illustrates another example pattern with a defect associated with a critical dimension. For example, the effect of a modified portion on a pattern and on neighboring patterns may be determined. The approach is illustrated using an example of a pattern surrounded by a number of neighboring patterns.

FIG. 3C shows a group of patterns. In the group, one of the patterns 122 is modified by the protrusion 121, thus affecting both the dimensions of the pattern 122, and the distances between the pattern 122 and other adjacent patterns 124 and 126 that are closest or approximate to the modified portion 121. The impact of the protrusion 121 may be estimated or determined based on the maximum of the relative CD that is changed as a result of the protrusion (i.e., a defect) 121.

To measure the influence of the protrusion 21 on the CD value or parameter of the pattern 122, its Dd1 and Dr1 should be measured at a position/direction where their difference/change is maximal.

The relative CD change may be estimated as:

$$\max|1 - Dd(\text{captured})/Dref)|$$

As an example, the ratio Dd1/Dr1 may be measured in the pattern 122 (related to the contour of interest at the base of the protrusion) was equal to 1.31. To measure the relative influence of the defect or protrusion 121 on the CD parameter of the pattern 122 with respect to pattern 126, Dd2 and Dr2 should be measured at a position/direction where their difference or change is maximal (or such a direction/position should be found automatically). For example, the ratio Dd2/Dr2 measured for the closest neighboring pattern 126 (e.g., represented by the dashed line between the pattern 122 and the pattern 126) is equal to 0.71.

Figure 4A:
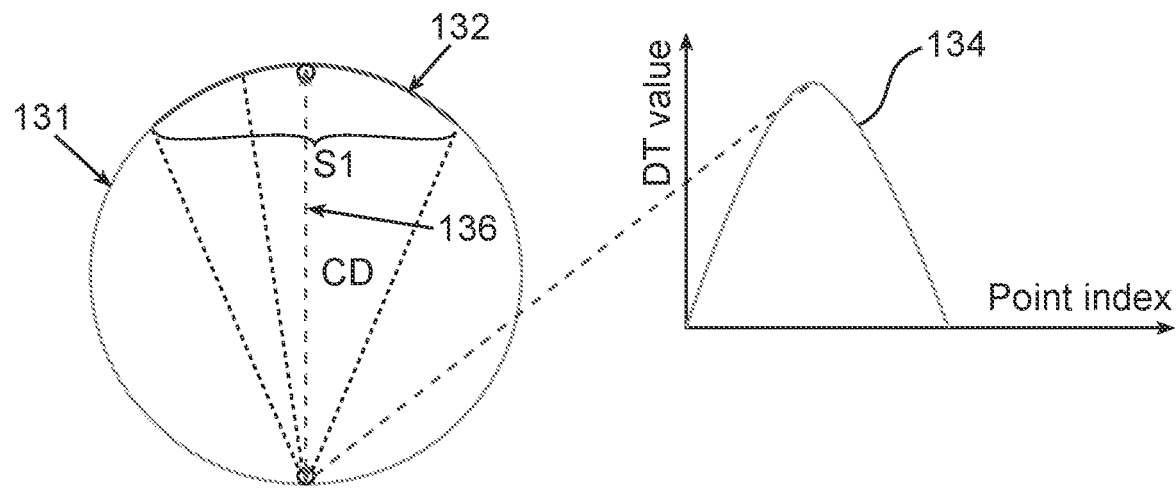
FIG. 4A illustrates the determining of a critical dimension parameter of a pattern having an arbitrary shape in accordance with some embodiments of the present disclosure.

FIG. 4A illustrates the determining of a critical dimension parameter of a pattern having an arbitrary shape. As shown, the CD parameter of an arbitrary pattern can be determined by using the Distance Transform function that measures distances at a variety of directions.

As shown, a pattern 131 may include a circular shape. Its external contour is shown as the boundary of the pattern 131. It may be considered a reference contour. The arc 132 indicates a set of points S1 being the contour of interest which is (or may be) modified or impacted by a defect. A DT function may be applied along various directions in vicinity of the contour of interest (set S1), namely between points of the contour of the pattern 131 and points of the arc 132 that includes the set S1 to measure distances, and DT values of such multiple measurements of the distances are shown on the graph 134. The extremum of the graph 134 corresponds to the diameter 136 of the pattern, measured at the center of the arc (e.g., at the center of the set of points S1 of the contour of interest). The extremum may represent the maximum distance between any point at the contour of the pattern 131 and any point at the arc 132. Such a measurement may be the CD parameter or value (e.g., its own local CD parameter) of the pattern with respect to the contour of interest S1.

Figure 4B:
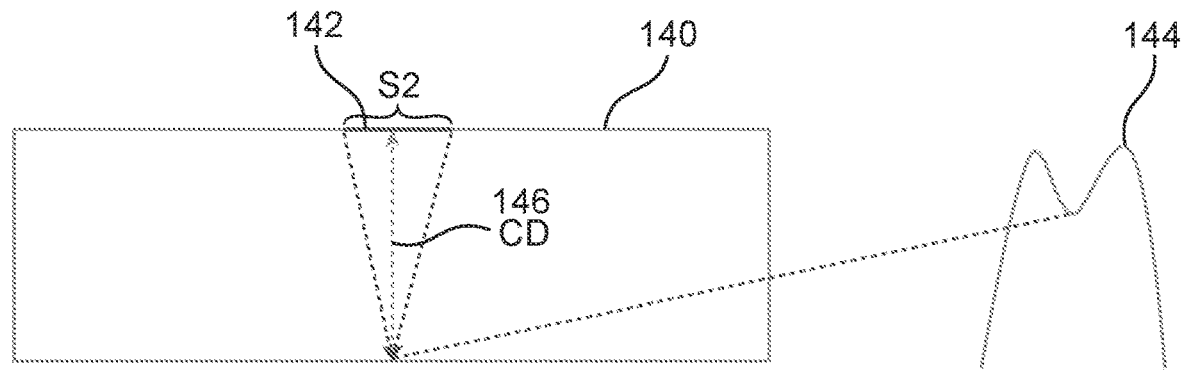
FIG. 4B illustrates another example of the determining of a critical dimension parameter of a pattern that is based on a line in accordance with some embodiments of the present disclosure.

FIG. 4B shows another example of a pattern 140 with a line-like pattern that includes a contour of interest 142 with a set of points S2. The DT function applied to the contours of the pattern in vicinity of the contour of interest 142 produces a graph 144 with three extremums. One of the extremums (e.g., the minimal value of the graph) is associated with the point on the line pattern at which the distance between the contour of the pattern and the contour 142 (e.g., the set of points S2) will change maximally. Such a distance 146 (CD), measured at this point, may be the CD parameter (e.g., a local CD) of the modified pattern. Moreover, since it has the minimal absolute value among the other distances forming extremums of 144 (it is normal to 142), distance 146 may be selected as the local CD parameter or value of the pattern 140.

FIGS. 4A and 4B demonstrate that the location on a pattern of a defect/modification (represented by its contour of interest) has an influence on the CD ratio of the pattern. The CD is called a Local CD and can be estimated through analysis of changes of the DT extremum values and ratios. The estimation may be provided by taking into account contours of the reference pattern and of the modified pattern (or contours of one of them and a contour of interest of a virtual/planned or real modification), closeness of the measurement direction to the normal direction to the contour of interest, and selecting the best candidates among measurement directions of the DT function.

Figure 5A:
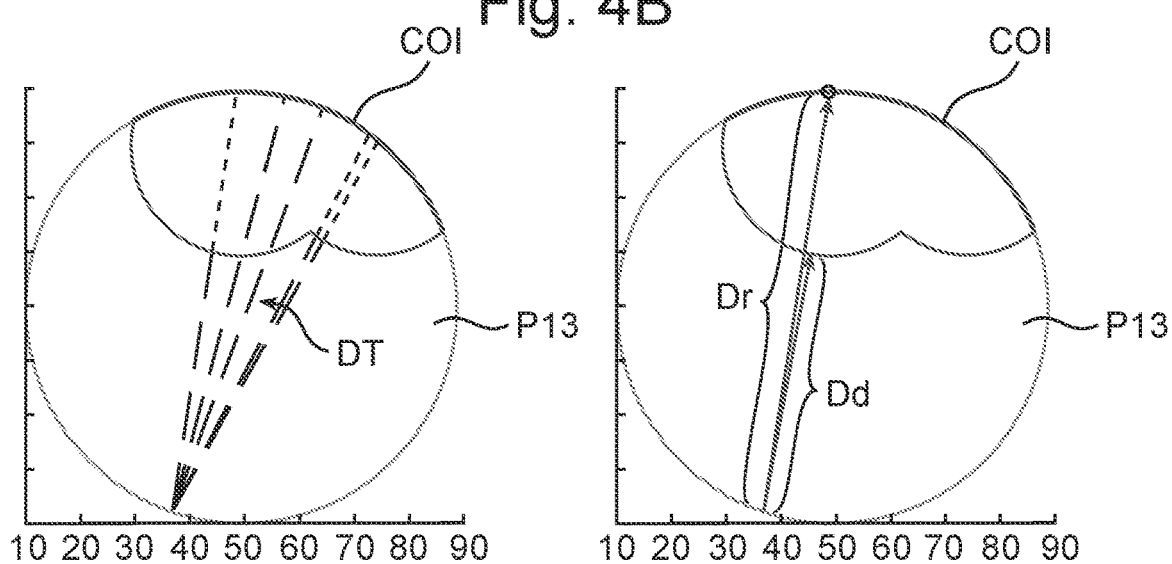
FIG. 5A illustrates the determining of a critical dimension parameter based on distance measurements in accordance with some embodiments.
Figure 5B:
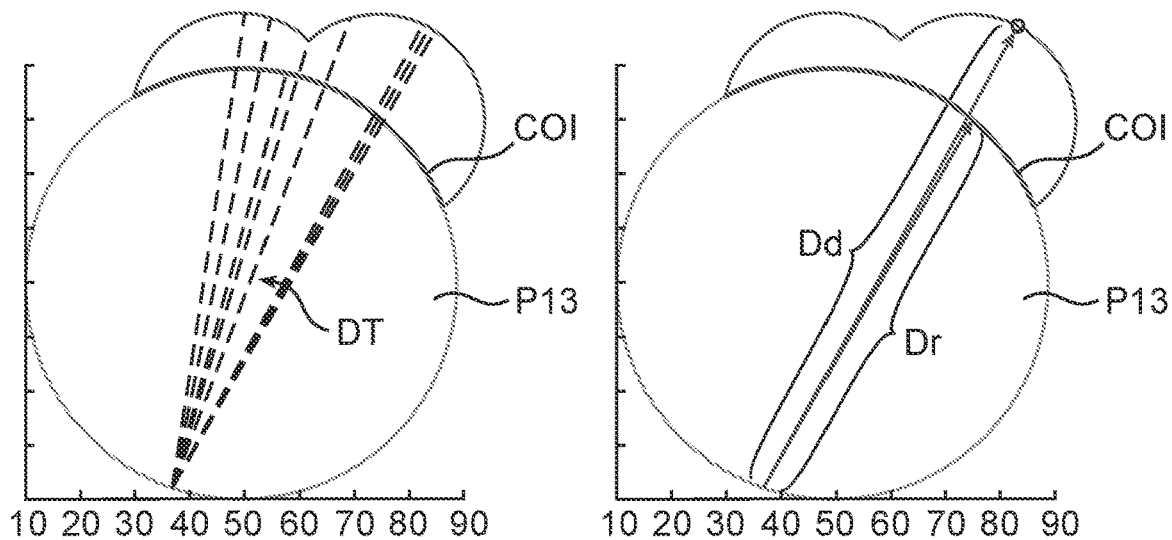
FIG. 5B illustrates another example of determining a critical dimension parameter based on distance measurements in accordance with some embodiments.

FIGS. 5A and 5B illustrate the determining of a critical dimension parameter based on distance measurement. For example, as shown, FIGS. 5A and 5B illustrate two examples where pattern P13 has a generally circular shape with differently located and differently shaped modified portions (or contours of interest). In this example, contours of interest indicate borders between the reference pattern and the modified pattern. As shown, candidates for the CD parameters or values may be measured from various directions in vicinity of the modified portion/COI and at least one of the candidates may be selected as a suitable local CD value or parameter. The directions are shown by black dashed lines (e.g., DT). In some embodiments, the directions which are closer to normal to the contours of the modified pattern and to the contour of interest COI may be better candidates to be used to determine the CD parameter of the pattern (the maximal relative change in dimension is shown by the measured Dr and Dd at the right).

Figure 5C:
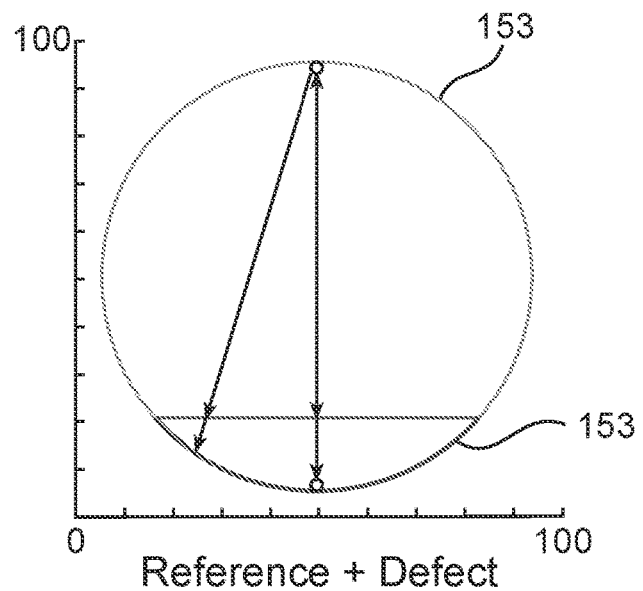
FIG. 5C illustrates the determining of a critical dimension parameter based on a ration associated with a reference image and an inspection image in accordance with some embodiments.
Figure 5C:
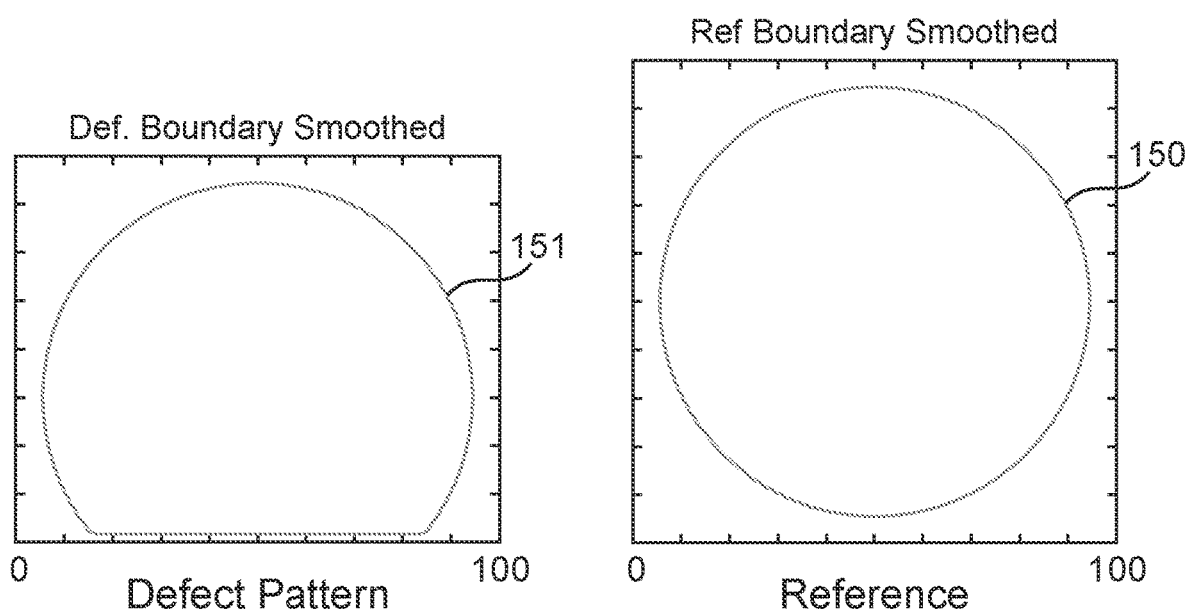

FIG. 5C illustrates the determining of a critical dimension parameter based on a ration associated with a reference image and an inspection image. As shown, a reference image 150 and a captured image 151 (e.g., of a defect) of the pattern may be received. The contour of interest 153 may be obtained in a combined image 153, and the CD parameter or value may be estimated for the resulting combined image 153.

FIG. 5C is also a verification that the maximal CD Ratio (indicating the CD parameter or the Local CD) which may be obtained for a circular shape of the pattern 150 having a defect presented near the contour of interest 153 is determined as 0.83. The measurements in vicinity of the contour of interest 153 may be performed by applying DT function.

Figure 6:
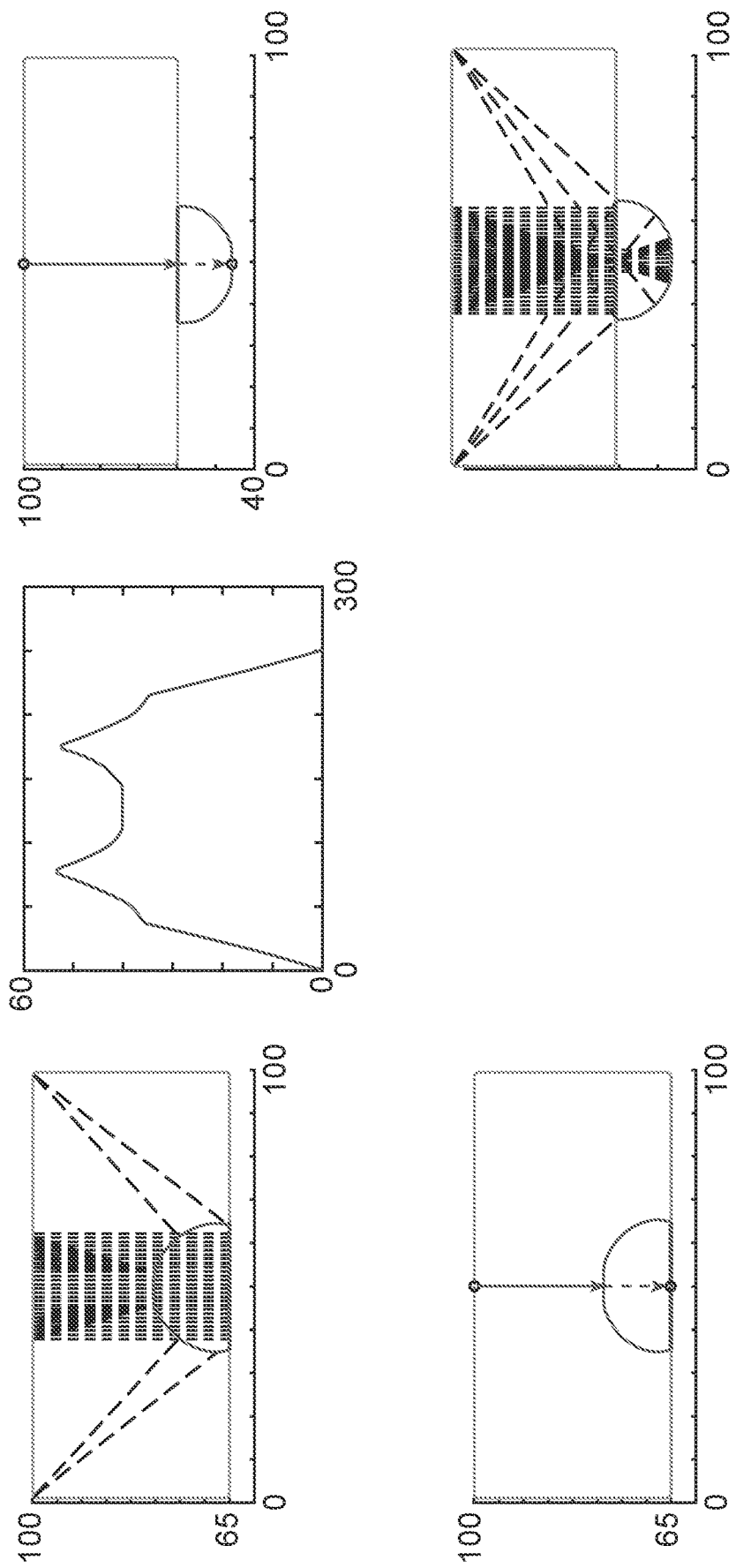
FIG. 6 illustrates the measuring of a critical dimension in accordance with some embodiments.
Figure 7:
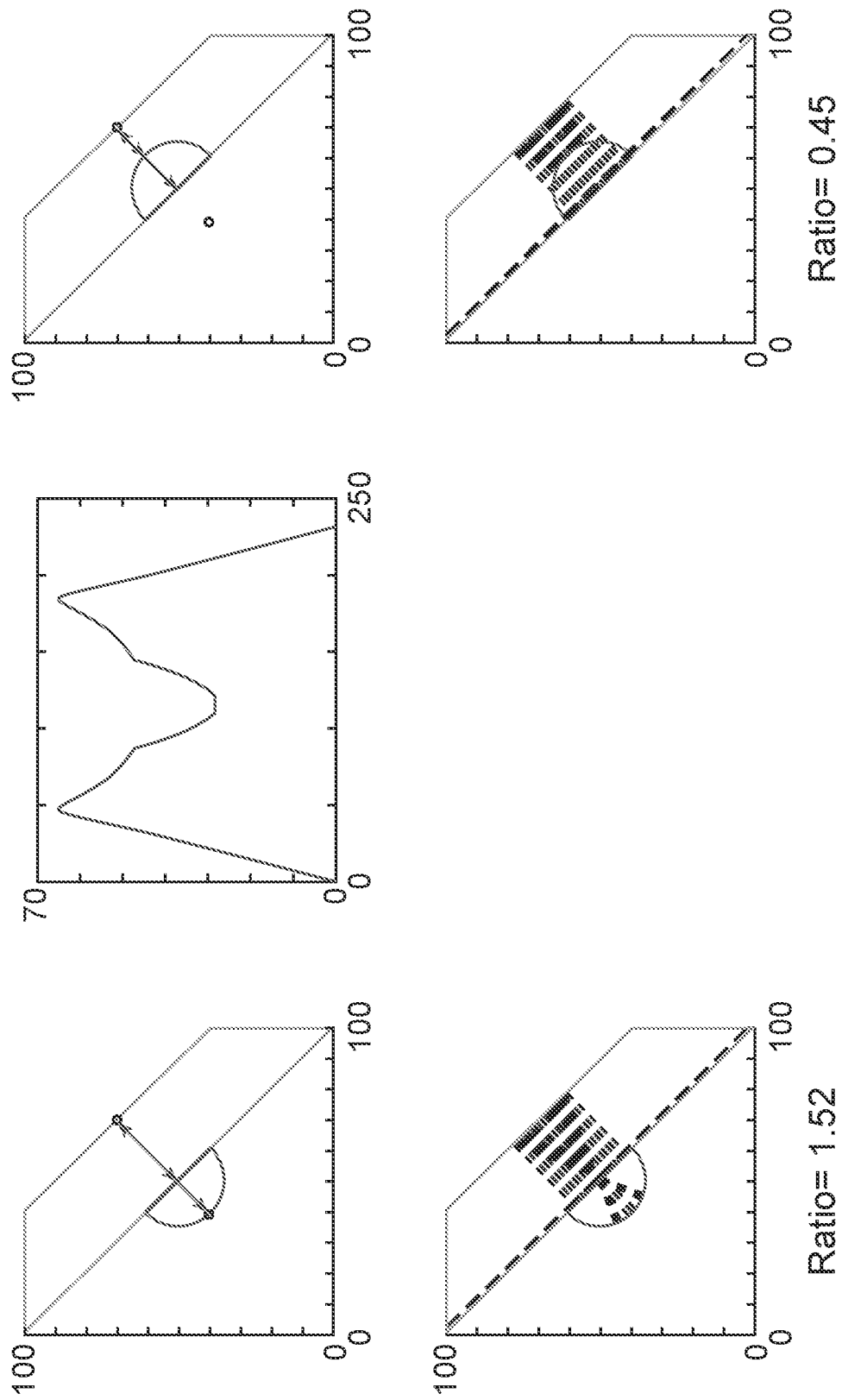
FIG. 7 illustrates another example of the measuring of a critical dimension in accordance with some embodiments.
Figure 8:
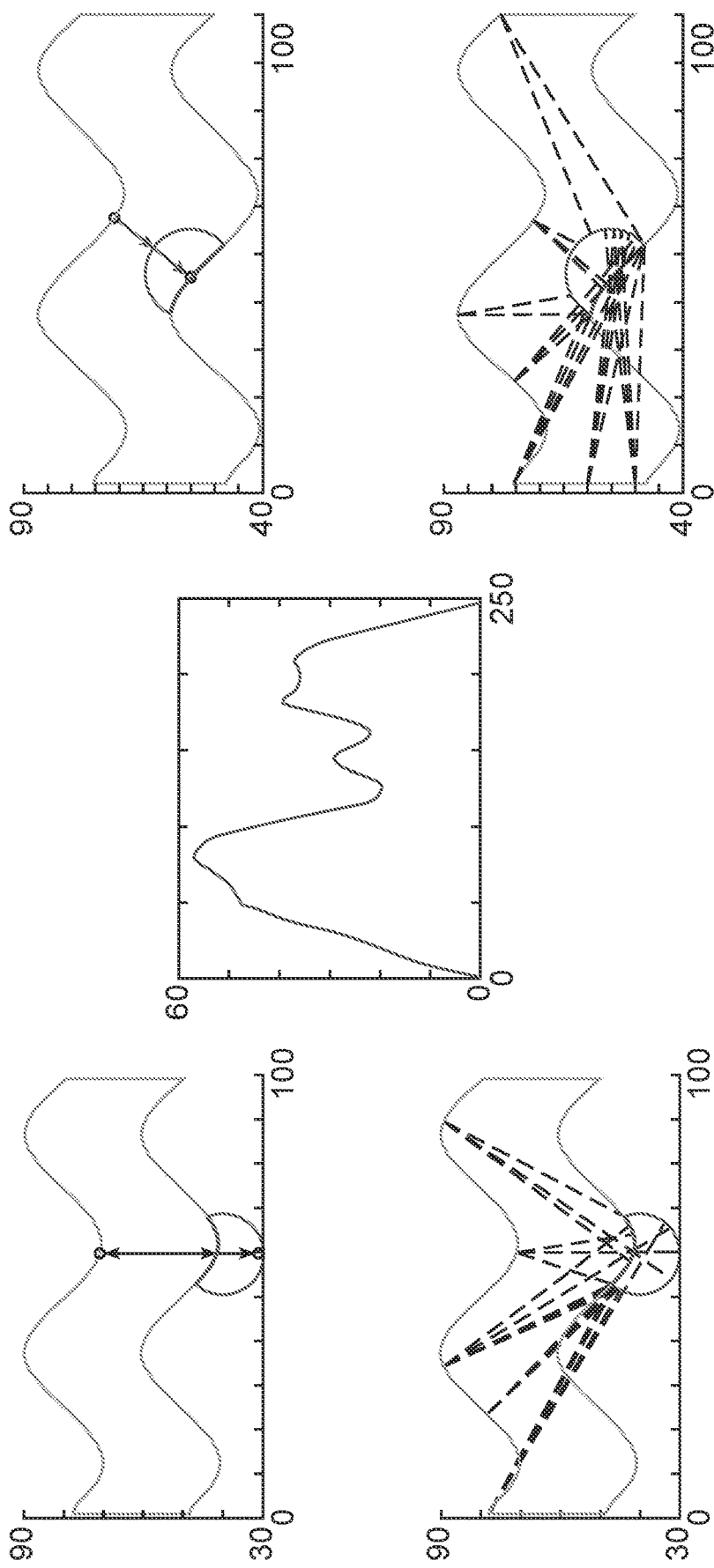
FIG. 8 illustrates another example of the measuring of a critical dimension in accordance with some embodiments.

FIGS. 6, 7, and 8 illustrate the measuring of a critical dimension. For example, each figure illustrates a different pattern, an operation to select a suitable direction for measuring CD parameters (for example, a DT operation) in different directions (shown by black dashed lines) in vicinity of the contours of interest and contours of modified portions (e.g., the protrusions and/or recesses). Corresponding graphs of DT values are built for these different patterns by the DT function. The graphs in the center of FIGS. 6, 7, and 8 relate at least to the corresponding examples placed to the left of the graphs (e.g., both to the left and the right examples since they have the same COIs and the symmetric modified portions). Each of the DT graphs illustrates the candidates of CD parameters as the measurements maximally affected by the modified portion (i.e., as the measurements close to extremums of the DT function). Then the CD parameter is selected as the measurement having the maximal CD ratio among the candidates. Exemplary values of the maximal CD Ratios are shown in the corresponding figures.

Figure 9:
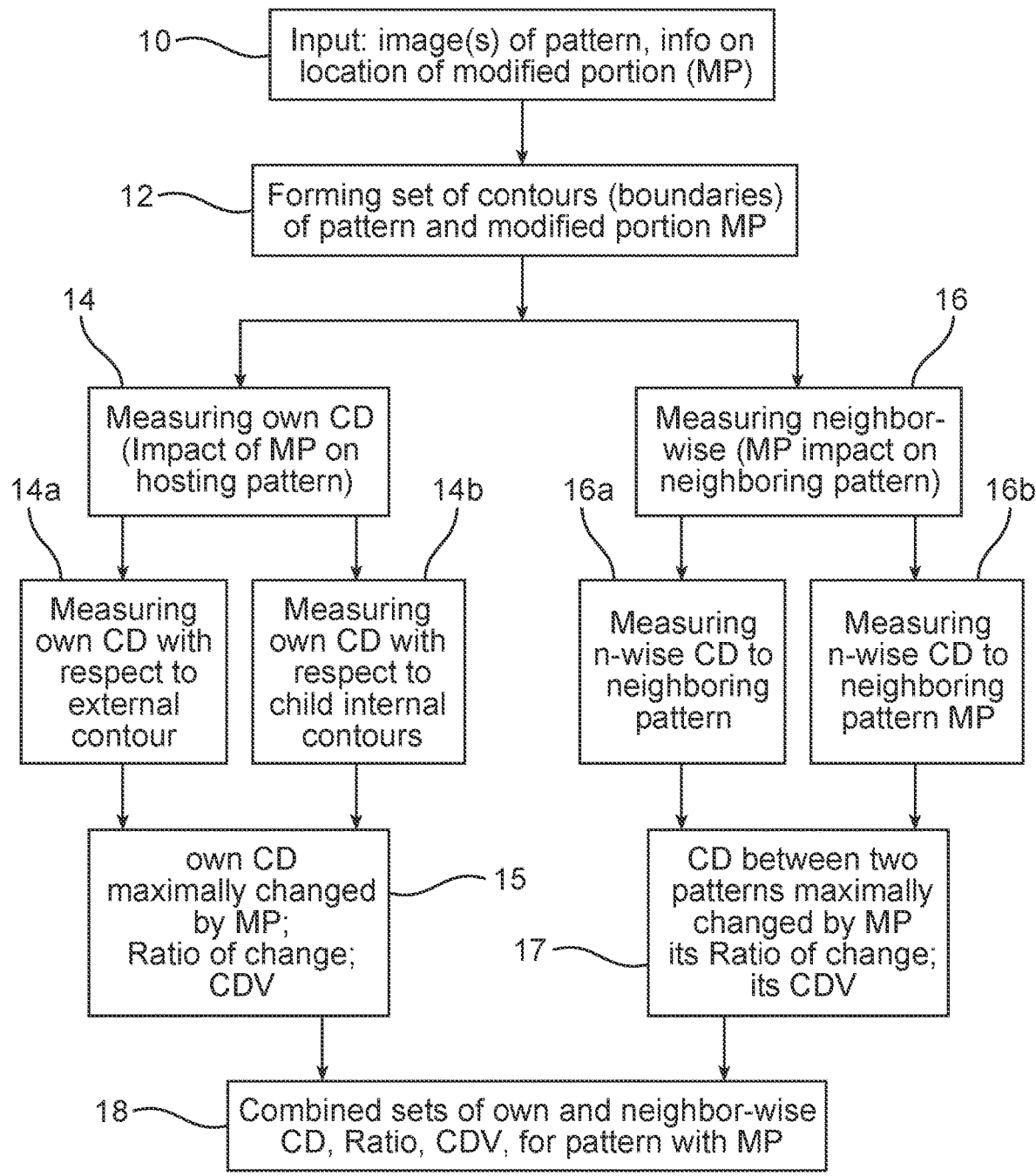
FIG. 9 is an example method to determine a variation in a critical dimension in accordance with some embodiments of the present disclosure.

FIG. 9 is an example method to determine a variation in a critical dimension. The method of FIG. 9 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the method may be performed by the critical dimension component (SP) of FIG. 1A.

In general, the CD parameters of a modified pattern may be determined to estimate the quality of the modified pattern. The quality of the modified pattern may correspond to a measurement of the influence of a modification or defect on the CD parameters of the modified pattern. Additionally, FIG. 9 includes separate branches for determining CD parameters and the estimating impact of a modified portion on the pattern based on the respective CD parameter. For example, a first branch may relate to determining the CD parameter within the hosting pattern (e.g., the left side branch for determining an own CD parameter) and the CD parameter with respect to one or more neighboring patterns (e.g., the right side branch for determining a neighbor-wise CD parameter).

In some embodiments, a local CD is measured within and/or outside of the pattern modified by the change order or defect, and then a determination is made as to how far the pattern was changed by the modification. For example, a ratio may be calculated between a modified dimension and the original (reference) dimension so that the output is the resulting change. As shown, at box 10, the processing device may receive an input image. For example, the input image may include at least one image of the pattern and some specific location data that identifies whether and where the pattern has (or supposed to have) a modified portion MP. In some embodiments, the pattern's image may constitute a SEM image, being either a captured image of a pattern or a reference image of the pattern. The data may include information on a contour of interest (COI), being a border between the pattern and the MP. If the MP is supposed or planned, then COI may be considered to be virtual.

At block 12, the processing device may form a set of boundaries (contours) based on the input received from block 10. For example, the set of boundaries may include the pattern's contour PC being a reference contour or a captured contour, a contour of a modified portion (CMP) if such a contour exists, the contour of interest COI is provided or created, etc. Other contours may be obtained based on the input data.

At block 14, the processing device measures an own CD parameter. For example, block 14 may correspond to a first branch for determining own CD measurements to estimate the impact of the MP on hosting pattern that includes the contour of interest itself. Block 14 corresponds to measuring the own CD in vicinity of the COI and/or CMP. Block 16 indicates a second branch for determining a neighbor-wise CD parameter or measurement to estimate impact of the MP on one or more neighboring patterns (e.g., other adjacent patterns that do not include the contour of interest). Block 16 corresponds to measuring the neighbor-wise CD in vicinity of the COI and CMP of the basic pattern.

The measurements of block 14 can be implemented by at least one of its sub-branches a) and b). As shown, at block 14, the processing device measures the own CD parameter within a solid hosting pattern. At block 14b, the processing devices measures the own CD parameter within a hosting pattern having internal (or child) contours. Block 15 indicates that for each of the options 14a and 14b, its corresponding own CD parameter may be selected as the measurement which has maximally changed due to presence of the MP. However, one maximally changed own CD parameter may be selected among all the measurements performed in 14a and 14b.

At block 15, the processing device may calculate respective Ratios of Change (and/or CDV) for the measurements, and may select the CD parameter which is characterized with the maximal values of Ratio and CDV. Analogously or alternatively, block 16a may correspond to the processing device measuring a neighbor-wise CD parameter with respect to a specific neighboring pattern. Block 16b may correspond to the processing device measuring a neighbor-wise CD with respect to a neighboring pattern's modified portion (MP') if also located between the pair of neighboring patterns.

At block 17, for each of the options 16a and/or 16b, the processing device may determine that the neighbor-wise CD parameter that has maximally changed due to presence of MP (MPs). At block 18, the processing device may collect the determined CD parameters from both branches of the flow chart into two combined sets of own and neighbor-wise CD parameters respectively, maximally changed due to existence of the modified portion MP at its specific location. The respective ratios and/or CDV values may also be recorded.

Figure 10:
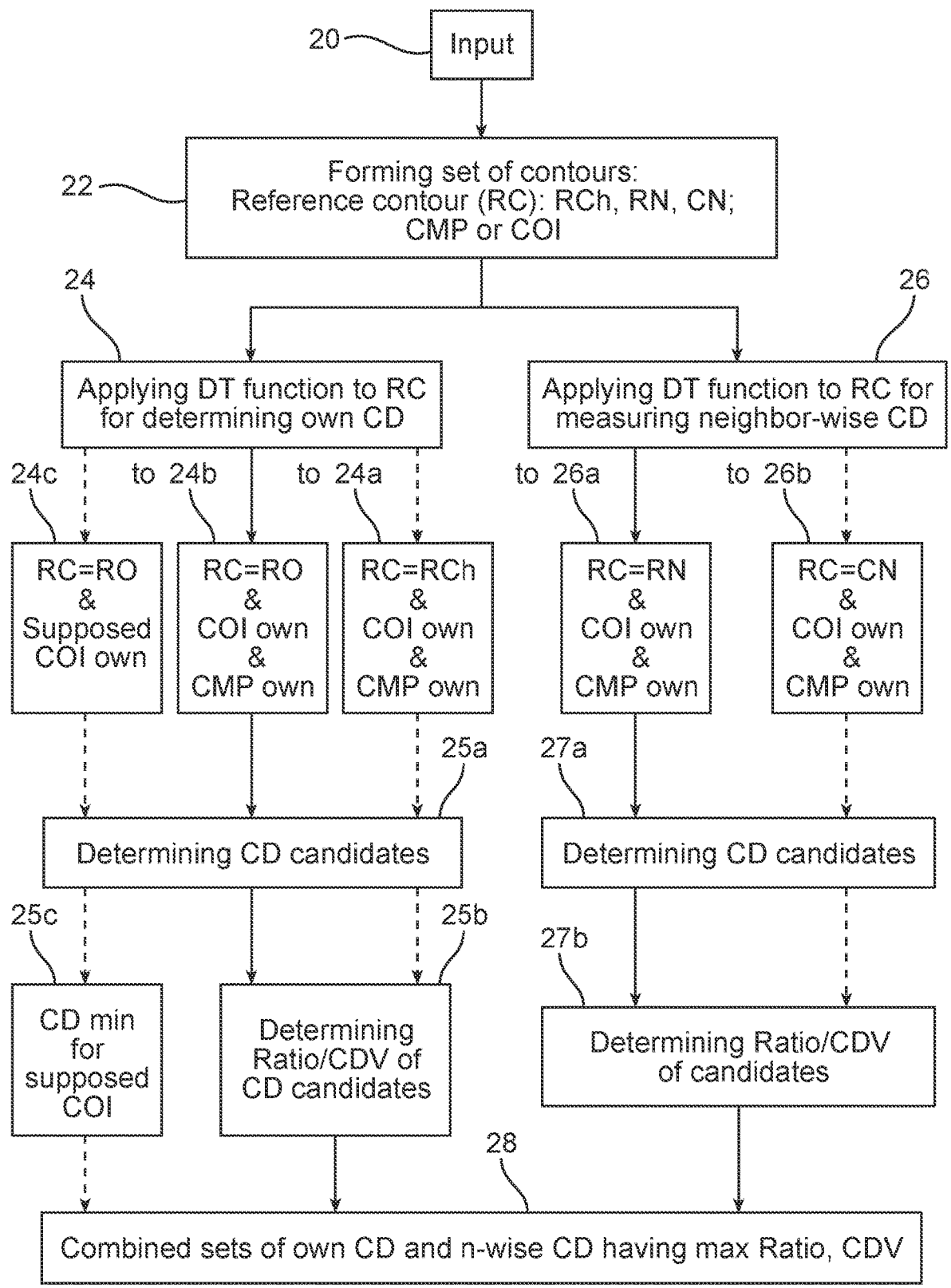
FIG. 10 is an example method to determine a variation in a critical dimension for a pattern having an arbitrary shape in accordance with some embodiments.

FIG. 10 illustrates an example method to determine a variation in a critical dimension for a pattern having an arbitrary shape. The method of FIG. 10 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the method may be performed by the critical dimension component (SP) of FIG. 1A.

In general, the CD parameters may be determined based on a Distance Transform (DT) function. In some embodiments, the DT function may determine an optimal measurement directions (associated with extremums of the DT function) and determine CD candidates at such directions. As shown, at block 20, the processing device may receive an input. The input may include two grey-level scanning electron microscope (SEM) images (e.g., a reference image and a captured or inspection image) of the pattern and the surrounding area so that information on a modified portion (MP) (e.g., a defect) may be obtained as a difference. For example, the difference may be between the pattern at the reference image and the inspection image. In the same or alternative embodiments, the input may include a reference image and information on a supposed contour of interest (COI). At block 22, the processing device may form a set of contours. The contours may include a reference contour (RC) for the pattern that may be selected from any or all of the reference own contour RO, reference child contour RCh, reference neighbor contour RN, and the captured neighbor contour CN (which may serve as a reference contour when it also has its modified portion).

In some embodiments, the contour of the modified portion (CMP) may be part of the own pattern or of a neighboring pattern. The contour of interest (COI) may be own (supposed or real), or a neighbor pattern's COI. If the CD parameter is measured for the pattern that includes the COI (e.g., the own CD parameter measurement), then the processing device may apply, at block 24, the DT function to a reference contour RC in the vicinity of the COI/CMP to measure the own CD parameter values. The processing device may apply the DT function based on blocks 24a, 24b, and 24c.

At block 24a, the processing device applies the DT function where RC is a reference own contour (RO) by using the own COI and the own CMP. In some embodiments, instead of the own CMP, the captured own contour CO may be used in vicinity of the COI. At block 24b, the processing device applies the DT function where RC is a reference child contour (RCh) by utilizing the own COI and the own CMP. In some embodiments, instead of the own CMP, the captured own contour CO may be used in vicinity of the COI. At block 24c, the processing device may apply the DT function where RC is a reference own contour (RO) and the own COI is used (e.g., no CMP exists). One or more extremums of the DT function may be obtained by applying the DT function along the COI with reference to other points of the RO.

Referring to FIG. 10, at block 25a, the processing device determines CD parameter candidates as extremums of the DT function for each of the blocks 24a, 24b, and 24c. At block 25b, the processing device may determine the ratio and/or CDV for each of the CD parameter candidates measured at block 25a. At block 25c, the processing device may determine the CD parameter candidate producing the maximal CDV. In some embodiments, the CD parameter candidate producing the minimal CDV may be determined.

As shown in FIG. 10, the neighbor-wise CD parameter measurement may be determined with respect to a neighboring, adjacent, or approximate pattern. For example, at block 26, the processing device may apply the DT function to the reference contour (RC) that is in the vicinity of the COI/CMP to measure the neighbor-wise CD parameter values. The DT function may be applied based on blocks 26a and/or 26b. For example, at block 26a, the processing device applies the DT function where RC is a reference neighbor pattern contour (RN) while the DT function uses the own COI and own CMP. In some embodiments, instead of the own CMP, the captured own contour CO may be used in vicinity of the COI. At block 26b, the processing device applies the DT function to determine neighbor-wise CD parameters between two modified portions positioned at two different neighboring patterns. For example, two pattern contours RC may be considered (e.g., the first RC may be reference neighbor contour (RN) and the second RC will be reference own contour (RO)). Respectively the modified portion MP1 may be the own pattern's MP and the modified portion MP2 may be the neighboring pattern's MP. In the same or alternative embodiments, the RC may be selected to be a captured contour of the neighboring pattern (CN as shown in 26b), and DT may use the own COI and CMP. As a result, a number of CD parameters values measuring the distance between the two modified portions may be detected.

At block 27a, the processing device determines CD parameters candidates as extremums of the DT function received at blocks 26a and/or 26b. At block 27b, the processing device determines a ratio and/or CDV for each of the CD parameter candidates found at block 27a (e.g., based on blocks 26a and/or 26b). At block 28, the processing device collects the determined CD parameter and/or CDV values from all branches and sub-branches of the method into two combined sets of 1) own and 2) neighbor-wise CD/CDV parameters respectively. The combined sets may include the own CD/CDV of a pattern having a real modification and/or the own CD parameter that has been determined for an arbitrary pattern when a supposed COI is given. If the pattern include more than one modified portion MP, then the own CD/CDV may be selected as the maximal CD/CDV from those defined for each of the MPs. The combined sets may further include neighbor-wise CD parameters with respect to respective several neighbor patterns where each of those CD parameters may be maximally changed (e.g., have the maximal ratio/CDV) due to existence of the modified portion MP at its specific location on the basic pattern (pattern of interest). A second set may include a combined neighbor-wise CD parameter selected among the mentioned neighbor-wise parameters to determine the neighbor pattern which is maximally affected by the MP on the basic pattern. In some embodiments, a second set of the may include a double-combined neighbor-wise CD parameter selected for the pattern having a number of MPs and a number of neighboring parameters. The double-combined CD may indicate the maximal change in dimensions (maximal CDV) produced by a combination of a specific MP and a specific neighbor pattern.

The determining of the CD parameter candidates may further be based on calculating a ration (e.g., Dd/Dr) and deriving the CDV as a selected function of ratio according to formula [1]: CDV=f(Ratio). The determination may be further based on calculating the ratio and derive CDV in percent, for example according to formula [2]:

CDV=max|(1−Ratio)|*100 (for any of the cases,own CD or neighbor-wise CD).

In the same or alternative embodiments, CDV is determined based on formula [3]:

$$CDV = \frac{[1 - \text{Ratio}]}{1 + C(|\cos(\alpha)| + |\cos(\beta)| + |\cos(\gamma)|)} \quad [3]$$

In some embodiments, the ratio is CDcaptured/CDreference, C is a weight coefficient, C is a weight coefficient, and α, β, and γ are angles respectively formed by the measurement direction selected for CD with reference contour RC, contour of interest COI, and the modified contour of interest MCOI (see for example FIG. 3A).

At block 28, the processing device may receive the combined sets that include the CD parameter and CDV values which will describe the impact of the modified portion to the own modified pattern and to its neighborhood. In some embodiments, a smoothing operation may be utilized to increase robustness and reduce the influence of noise (for example, see FIG. 5C).

Figure 11:
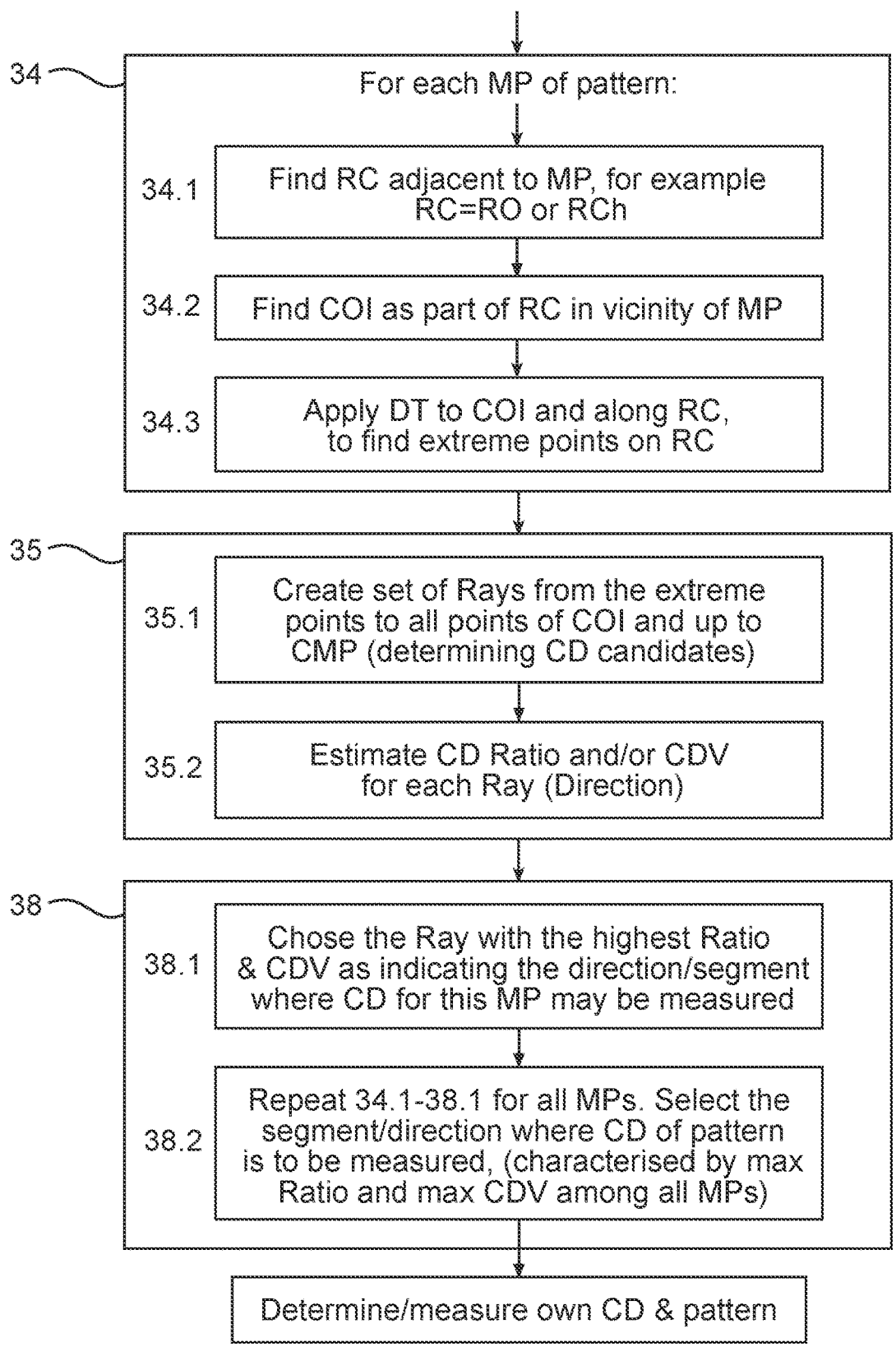
FIG. 11 is another example method to determine a variation in a critical dimension for a pattern having an arbitrary shape in accordance with some embodiments.

FIG. 11 is a flow diagram of an example method to determine a variation in a critical dimension for a pattern having an arbitrary shape. The method of FIG. 11 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the method may be performed by the critical dimension component (SP) of FIG. 1A.

IUn general, an input may be received where the input may include two binary images of the pattern (reference own image and captured or inspection own image), and the location information of the modified portion can be obtained as a difference between the two images. Set of contours may be similar to that shown in block 22 of FIG. 10. In some embodiments, blocks 34-38 may correspond to blocks 24-28 of FIG. 10. For example, the set of contours may include RO, RCh, and MPC. COI may be obtained as the boundary between MP (MPC) and RO. In some embodiments, COI may be a boundary between MP and RCh. For each modified portion MP detected on the pattern, certain actions as described below may be performed.

At block 34, a processing device may apply the DT function to COI with respect to RC (being it RO or RCh) to determine extreme points of the function. RC may be selected as the reference contour excluding the COI and may be adjacent (the closest) to the modified portion (e.g., blocks 34.1, 34.2, and 34.3). At block 35, the processing device may use the extremums found on the RC, determine directions of the measurement by creating a set of rays between RC and points of COI, and perform at each of those directions a pair of measurements of a reference distance Dr and a captured/modified/defect distance Dd (e.g., blocks 35.1 and 35.2). These pairs of measurements will then produce CD parameter candidates. While Dr may be measured between RC and the COI, Dd may be measured in the same direction of the ray between the RC and the contour of modified portion MPC. Based on measurements of Dr and Dd, the ratio and/or CDV may be estimated for each such pair of measurements (e.g., for each direction/ray).

At block 38 the processing device may determine or measure the own CD parameter and pattern. For example, at block 38.1, the processing device selects the CD candidate having the maximal ratio and/or CDV. At block 38.2 the processing device may, if there are more than one modified portions in the pattern, find CD candidates for each of the modified patterns. All of the CD candidates may then be compared to select the most critical own CD parameter of the pattern as the own CD measurement having the maximal ratio and CDV over all the modified portions.

At block 38.2, the processing device may measure the selected own CD parameter. It may also be sent to the combined set of CDs for that pattern (see blocks 18 and 28), preferably together with its ratio and CDV. It should be noted that for each MP (e.g., if there are more than one MP on the pattern of interest), its corresponding set of CD & CDV will be created, and the maximal own CD (and/or CDV) will be then selected among all the MPs. A combined set of neighbor-wise CDs (produced by blocks 38.3 and 38.4) is described below with reference to FIG. 12.

Figure 12:
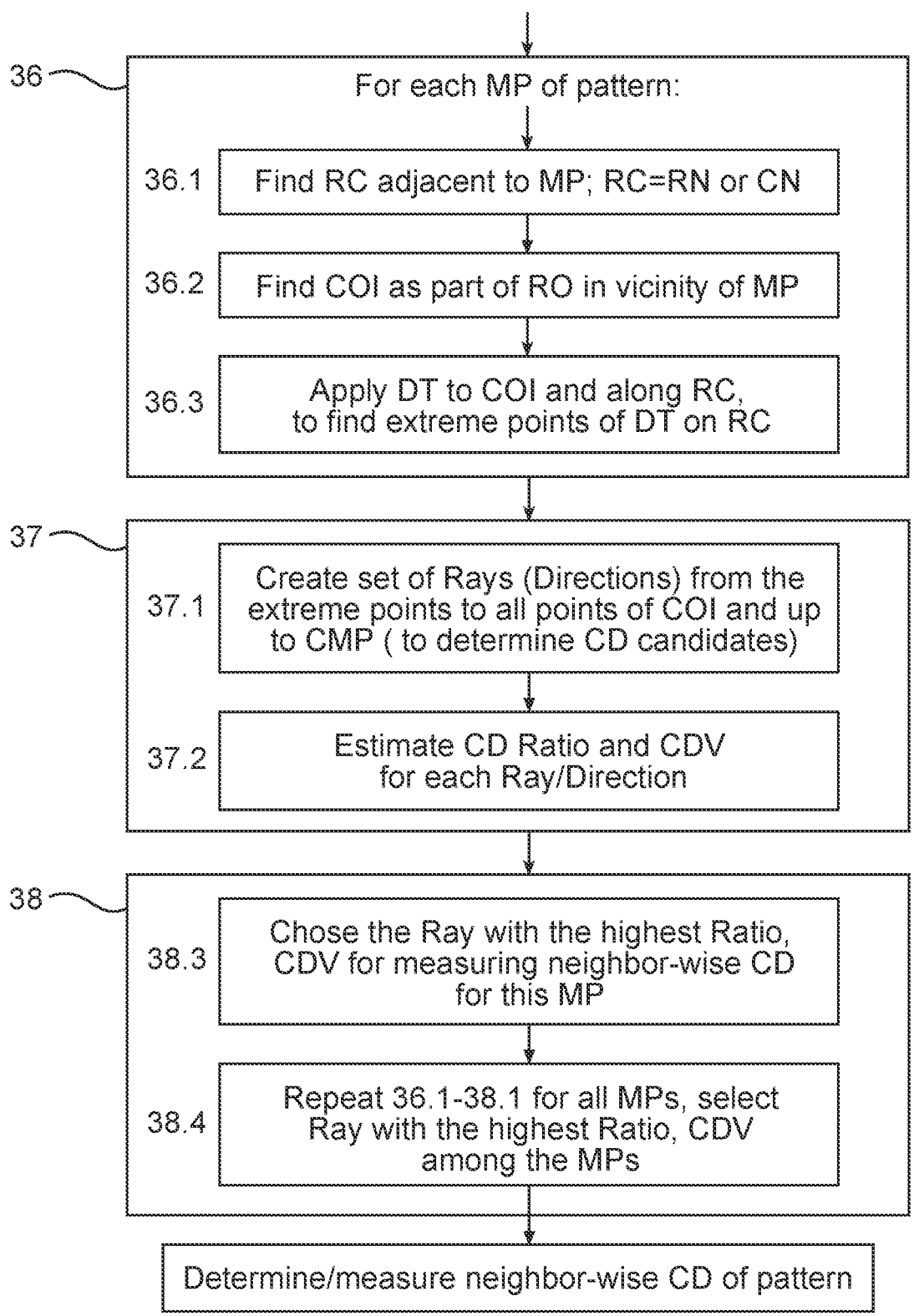
FIG. 12 is an example method to determine a neighbor-wise critical dimension parameter for a pattern having an arbitrary shape and a neighboring pattern in accordance with some embodiments.

FIG. 12 illustrates an example method to determine a neighbor-wise critical dimension parameter for a pattern having an arbitrary shape and a neighboring pattern. As such, the measurement of a neighbor-wise CD parameter may be performed. The method of FIG. 12 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the method may be performed by the critical dimension component (SP) of FIG. 1A.

In some embodiments, an input may be received where the input may include binary images of the pattern with its surrounding (reference own image, reference neighboring image, captured neighbor image), and the location information of the modified portion may include MP on the own image and MP' on the neighbor image. The set of contours may be similar to that shown in block 22 of FIG. 10. For example, the set of contours may include RO, RN, CN, and MPC. The CN (Captured Neighbor's contour) may be used as RC if the neighboring pattern also has a modified portion on the side of the basic pattern. COI may be obtained as the boundary between MP (MPC) and RO. The method may be performed for each modified portion (MP) that is detected on the basic own pattern.

At block 36, the processing device may apply a DT function to COI with respect to RC (being either RN or CN) to find extreme points of the function. For example, the processing device may use the function's extremums (minimums, maximums) and the ending points found on the RC, determine directions of the measurement by creating a set of rays between RC (being RN or CN) and points of COI, and perform a pair of measurements Dr and Dd at each of those directions (e.g., blocks 36.1, 36.2, and 36.3). Each pair of such measurements will then produce a neighbor-wise CD candidate.

At blocks 37 (e.g., 37.1 and 37.2), the processing device may measure Dr between RC and COI and Dd may be measured in the same direction of the ray between the RC and the contour of the modified portion MPC. Based on the measurements of Dr and Dd, the neighbor-wise ratio and/or CDV may be estimated for each such direction/ray.

At block 38 (e.g., block 38.3), the processing device may select the neighbor-wise CD candidate with the maximal ratio/CDV for the specific MP/defect on the basic pattern. At block 38.4, the processing device may, if there is more than one modified portion in the basic pattern, determine neighbor-wise CD candidates for each basic pattern. All of the CD candidates may be then compared to select the most critical (combined) neighbor-wise CD parameter of the pattern as the CD measurement having the maximal ratio and CDV over the modified portions. For each MP on the basic pattern, the patterns neighbor-wise CD may be selected as the CD giving the maximal CDV value among all neighboring patterns. If all the options are done together, the combined CD/CDV may be turned into a double-combined CD/CDV.

At block 38.4, the processing device selects the neighbor-wise CD parameter for the pattern. The selected neighbor-wise CD may be sent to the combined set of CDs for that pattern (see blocks 18 and 28).

In some embodiments, the neighbor-wise CD may be measured (with or without applying a DT function) for each modified portion MP (e.g., defect) on the basic pattern. For example, a CD may be defined between the defect and a neighboring pattern as a distance between the contour of the defect and the neighboring pattern to determine the maximal. CDV. The variation or ratio of the CD due to defect or due to two defects may be determined if there is a defect on the neighboring pattern as well. A criterion (CDV) may be calculated for the variation and the best segment that is associated with the greatest CDV value (and the greatest neighbor-wise ratio) may be selected. This procedure may then be repeated for each MP on the pattern of interest with respect to all neighboring patterns, and select for this MP a combined neighbor-wise CD being CD of the neighboring pattern giving the maximal CD variation. In some embodiments, the closest to an MP neighboring pattern gives the maximal CD variation. Such a process may be repeated for all defects (MPs) of the basic pattern to choose the largest neighbor-wise ratio/CDV value among them and the appropriate segment for measuring a double-combined neighbor-wise CD for the basic pattern.

Figure 13:
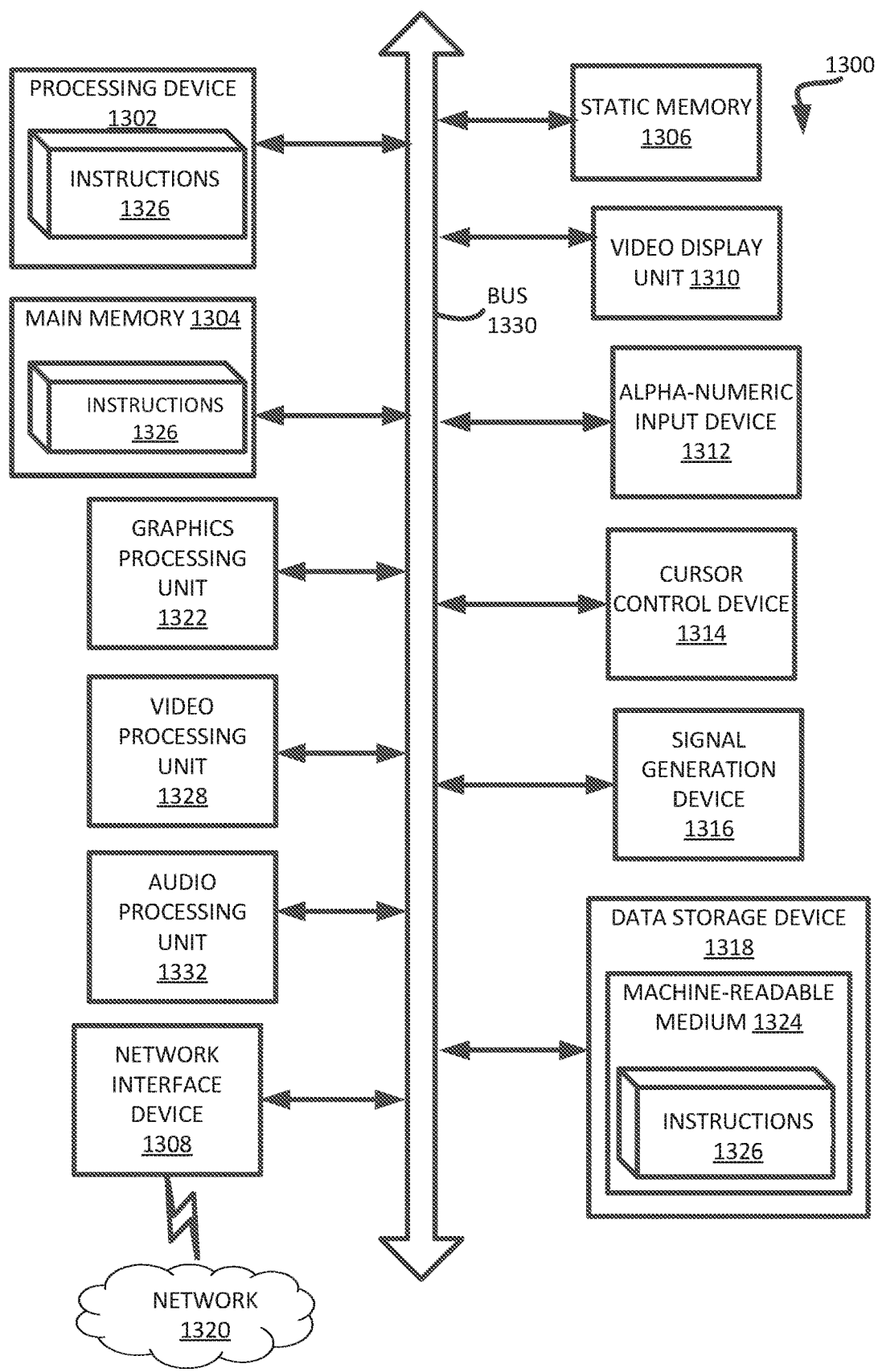
FIG. 13 is a block diagram of an example computer system in which implementations of the present disclosure may operate.

FIG. 13 illustrates an example machine of a computer system 1300 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1300 includes a processing device 1302, a main memory 1304 (e.g., read-only memory (ROM), flash memory, dynamic random access memory (DRAM) such as synchronous DRAM (SDRAM) or Rambus DRAM (RDRAM), etc.), a static memory 1306 (e.g., flash memory, static random access memory (SRAM), etc.), and a data storage device 1318, which communicate with each other via a bus 1330.

Processing device 1302 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 1302 is configured to execute instructions 1326 for performing the operations and steps discussed herein.

The computer system 1300 may further include a network interface device 1308 to communicate over the network 1320. The computer system 1300 also may include a video display unit 1310 (e.g., a liquid crystal display (LCD) or a cathode ray tube (CRT)), an alphanumeric input device 1312 (e.g., a keyboard), a cursor control device 1314 (e.g., a mouse), a graphics processing unit 1322, a signal generation device 1316 (e.g., a speaker), graphics processing unit 1322, video processing unit 1328, and audio processing unit 1332.

The data storage device 1318 may include a machine-readable storage medium 1324 (also known as a computer-readable medium) on which is stored one or more sets of instructions or software 1326 embodying any one or more of the methodologies or functions described herein. The instructions 1326 may also reside, completely or at least partially, within the main memory 1304 and/or within the processing device 1302 during execution thereof by the computer system 1300, the main memory 1304 and the processing device 1302 also constituting machine-readable storage media.

In one implementation, the instructions 1326 include instructions to implement functionality corresponding to a critical dimension component (e.g., critical dimension component (SP) of FIG. 1A). While the machine-readable storage medium 1324 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A method comprising:
receiving a captured image of a pattern;
receiving a reference image of the pattern;
identifying a contour of interest of the pattern;
determining, by a processing device, one or more measurements of a dimension of the pattern for each of the reference image and the captured image with respect to the contour of interest of the pattern, wherein determining the one or more measurements of the dimension of the pattern comprises:
determining a first plurality of measurements each corresponding to a distance from a particular point of a pattern to a respective point along the contour of interest of the pattern in the captured image; and
determining a second plurality of measurements each corresponding to a distance from a particular point of the pattern to a respective point along the contour of interest of the pattern in the reference image; and
classifying a defect associated with the contour of interest based on the determined one or more measurements of the dimension of the pattern for each of the reference image and the captured image.

2. The method of claim 1, wherein the contour of interest corresponds to a location of a modification to the pattern that is associated with the defect.

3. The method of claim 1, wherein the plurality of points along the contour of interest are associated with different directions from the particular point of the pattern to the contour of interest.

4. The method of claim 1, wherein the method further comprises:
determine a critical dimension parameter value for each respective point along the contour of interest based on a pair of measurements from the first and second plurality of measurements.

5. The method of claim 4, wherein the defect is classified based on the critical dimension parameter value having a maximum difference between a respective measurement from the first plurality of measurements associated with the captured image and another respective measurement from the second plurality of measurements associated with the reference image.

6. The method of claim 1, wherein the one or more measurements are determined based on a distance transform function.

7. A system comprising:
a memory; and
a processing device, operatively coupled with the memory, to:
receive a captured image of a pattern;
receive a reference image of the pattern;
identify a contour of interest of the pattern;
determine one or more measurements of a dimension of the pattern for each of the reference image and the captured image with respect to the contour of interest of the pattern by determining a first plurality of measurements each corresponding to a distance from a particular point of a pattern to a respective point along the contour of interest of a pattern in the captured image, and determining a second plurality of measurements each corresponding to a distance from a particular point of the pattern to a respective point along the contour of interest of the pattern in the reference image; and
classify a defect associated with the contour of interest based on the determined one or more measurements of the dimension of the pattern for each of the reference image and the captured image.

8. The system of claim 7, wherein the contour of interest corresponds to a location of a modification to the pattern that is associated with the defect.

9. The system of claim 7, wherein the plurality of points along the contour of interest are associated with different directions from the particular point of the pattern to the contour of interest.

10. The system of claim 7, wherein the processing device is further to:
determine a critical dimension parameter value for each respective point along the contour of interest based on a pair of measurements from the first and second plurality of measurements.

11. The system of claim 10, wherein the defect is classified based on the critical dimension parameter value having a maximum difference between a respective measurement from the first plurality of measurements associated with the captured image and another respective measurement from the second plurality of measurements associated with the reference image.

12. The system of claim 7, wherein the one or more measurements are determined based on a distance transform function.

13. A non-transitory computer readable medium comprising instructions, which when executed by a processing device, cause the processing device to perform operations comprising:
receiving a captured image of a pattern;
receiving a reference image of the pattern;
identifying a contour of interest of the pattern;
determining one or more measurements of a dimension of the pattern for each of the reference image and the captured image with respect to the contour of interest of the pattern by determining a first plurality of measurements each corresponding to a distance from a particular point of a pattern to a respective point along the contour of interest of a pattern in the captured image, and determining a second plurality of measurements each corresponding to a distance from a particular point of the pattern to a respective point along the contour of interest of the pattern in the reference image; and
classifying a defect associated with the contour of interest based on the determined one or more measurements of the dimension of the pattern for each of the reference image and the captured image.

14. The non-transitory computer readable medium of claim 13, wherein the contour of interest corresponds to a location of a modification to the pattern that is associated with the defect.

15. The method of claim 13, wherein the plurality of points along the contour of interest are associated with different directions from the particular point of the pattern to the contour of interest.

16. The method of claim 13, wherein the operations further comprise:
determining a critical dimension parameter value for each respective point along the contour of interest based on a pair of measurements from the first and second plurality of measurements.

17. The method of claim 16, wherein the defect is classified based on the critical dimension parameter value having a maximum difference between a respective measurement from the first plurality of measurements associated with the captured image and another respective measurement from the second plurality of measurements associated with the reference image.

* * * * *